(12) United States Patent
Pannullo

(10) Patent No.: US 11,503,822 B2
(45) Date of Patent: Nov. 22, 2022

(54) ATTACHABLE PLUG FOR ADDING FEATURES TO A TORCH SYSTEM

(71) Applicant: Joseph Pannullo, Essex Fells, NJ (US)

(72) Inventor: Joseph Pannullo, Essex Fells, NJ (US)

(*) Notice: Subject to any disclaimer, the term of this patent is extended or adjusted under 35 U.S.C. 154(b) by 0 days.

(21) Appl. No.: 17/138,322

(22) Filed: Dec. 30, 2020

(65) Prior Publication Data

US 2022/0015351 A1 Jan. 20, 2022

Related U.S. Application Data

(63) Continuation-in-part of application No. PCT/US2020/062120, filed on Nov. 25, 2020, which is a continuation-in-part of application No. 17/023,957, filed on Sep. 17, 2020, which is a continuation-in-part of application No. 16/928,767, filed on Jul. 14, 2020, now Pat. No. 10,842,146.

(51) Int. Cl.
*A01M 29/12* (2011.01)
*F21V 37/00* (2006.01)
*F21W 131/10* (2006.01)

(52) U.S. Cl.
CPC .......... *A01M 29/12* (2013.01); *F21V 37/0012* (2013.01); *F21W 2131/10* (2013.01)

(58) Field of Classification Search
CPC ............................. A01M 29/12; F21V 37/0012
See application file for complete search history.

(56) References Cited

U.S. PATENT DOCUMENTS

| 52,618 | A | * | 2/1866 | Stansell | ............... F23D 3/00 431/315 |
| 143,143 | A | * | 9/1873 | Hallas | ............... F23D 3/00 431/303 |

(Continued)

FOREIGN PATENT DOCUMENTS

| EP | 0096111 A2 | 12/1983 |
| JP | 63201422 A | 8/1988 |

(Continued)

OTHER PUBLICATIONS

Office Action for U.S. Appl. No. 16/928,767, dated Sep. 11, 2020, 29 Pages.

(Continued)

*Primary Examiner* — Avinash A Savani
*Assistant Examiner* — Deepak A Deean
(74) *Attorney, Agent, or Firm* — Maine Cernota & Rardin

(57) ABSTRACT

A plug is attachable to a wall of a torch that is configured to burn a liquid fuel. The plug adds one or more features to the torch, such as a fuel level sensor, a temperature sensor, a tilt sensor, an automatic wick ignitor and/or extinguisher, a wick clamp, a wick advancing mechanism, and/or a global positioning system. The plug includes an electronic controller, and wired and/or wireless electronics configured to provide remote control and/or monitoring of the added features. Power for the plug can be provided by a battery and/or a solar panel. The controller can establish a unique torch identity, thereby enabling a remote computing device to monitor and/or control features of a plurality of torches that each have a plug of the present disclosure attached thereto. The plug can be removably or permanently attached to the torch.

13 Claims, 18 Drawing Sheets

(56) References Cited

U.S. PATENT DOCUMENTS

| | | | |
|---|---|---|---|
| RE6,844 E * | 1/1876 | Ambrose | 431/321 |
| 252,195 A | 1/1882 | Decker | |
| 262,804 A | 8/1882 | Marichenski | |
| 372,020 A * | 10/1887 | Hardcastle | F23D 3/00 |
| | | | 431/17 |
| 411,813 A | 12/1889 | Marzo | |
| 594,264 A * | 11/1897 | Mlller | F23D 3/00 |
| | | | 431/307 |
| 771,567 A | 10/1904 | O'Brien | |
| 826,423 A | 7/1906 | Haden | |
| 945,569 A | 1/1910 | Millea | |
| 1,142,816 A | 6/1915 | Kaufman | |
| 1,161,745 A | 11/1915 | Springman | |
| 1,259,791 A | 3/1918 | Simmons | |
| 1,310,560 A | 7/1919 | Cook | |
| 1,349,267 A | 8/1920 | Craig | |
| 1,391,956 A | 9/1921 | Henry | |
| 1,442,228 A | 1/1923 | La Salle | |
| 1,763,164 A | 6/1930 | Lavigne | |
| 1,790,480 A | 1/1931 | Macomber | |
| 1,905,918 A | 4/1933 | Lennmor | |
| 2,197,686 A | 4/1940 | Flutsch | |
| 2,210,751 A | 8/1940 | Cronkhite | |
| 2,276,039 A | 3/1942 | Horther | |
| 2,495,230 A | 1/1950 | Day et al. | |
| 2,499,118 A | 2/1950 | Sipes | |
| 2,604,113 A | 7/1952 | Barsano | |
| 3,817,686 A | 6/1974 | Quittner | |
| 4,193,417 A | 3/1980 | Bowman | |
| 4,417,870 A | 11/1983 | Nakamura | |
| 4,470,433 A | 9/1984 | Vipond | |
| 4,477,247 A | 10/1984 | Kumasaka | |
| 4,582,478 A | 4/1986 | Hilker | |
| 4,667,278 A * | 5/1987 | Poyer | F21S 8/00 |
| | | | 362/267 |
| 4,835,663 A | 5/1989 | Abbott et al. | |
| 4,847,192 A * | 7/1989 | Fujimoto | F23D 3/28 |
| | | | 431/307 |
| 4,974,134 A * | 11/1990 | Bourne | F21S 8/028 |
| | | | 362/286 |
| 5,057,005 A * | 10/1991 | Kwok | F21S 13/00 |
| | | | 431/253 |
| 5,263,794 A | 11/1993 | Webb | |
| 5,297,896 A | 3/1994 | Webb | |
| 5,472,340 A | 12/1995 | Lynch | |
| 5,540,250 A | 7/1996 | Mullins | |
| 5,932,842 A | 8/1999 | Eberl | |
| 5,980,238 A * | 11/1999 | Collins, Sr. | F23N 5/082 |
| | | | 431/18 |
| 6,006,773 A | 12/1999 | Bravo | |
| 6,370,738 B1 | 4/2002 | Dion, Jr. | |
| 6,579,090 B1 | 6/2003 | Taubitz | |
| 6,746,235 B1 * | 6/2004 | Aszenbrenner | F23D 3/02 |
| | | | 431/125 |
| 8,191,932 B2 | 6/2012 | Davis | |
| 8,390,981 B1 * | 3/2013 | Treadaway | F23Q 21/00 |
| | | | 361/253 |
| 8,435,029 B2 | 5/2013 | Masterson et al. | |
| 8,678,045 B1 | 3/2014 | Jorge | |
| 8,823,714 B1 * | 9/2014 | Thielvoldt | F24C 3/006 |
| | | | 704/200 |
| 9,249,897 B2 | 2/2016 | Acosta | |
| 9,267,681 B2 | 2/2016 | Barudi et al. | |
| 9,810,426 B2 * | 11/2017 | Bauswell | F23D 3/16 |
| 10,317,077 B2 | 6/2019 | Hansen et al. | |
| 10,378,754 B1 | 8/2019 | Durrence | |
| 10,393,379 B2 | 8/2019 | Lev | |
| 10,485,367 B2 | 11/2019 | Kopolowitz | |
| 10,842,146 B1 * | 11/2020 | Pannullo | F21V 37/0045 |
| 11,209,160 B2 | 12/2021 | Wu | |
| 11,266,141 B1 | 3/2022 | Chojnacki | |
| 2002/0146656 A1 | 10/2002 | Thigpen | |
| 2003/0036030 A1 | 2/2003 | Doppelt | |
| 2005/0104371 A1 | 5/2005 | Atkinson | |
| 2006/0134571 A1 | 6/2006 | St-Germain | |
| 2007/0160944 A1 | 7/2007 | Knight | |
| 2011/0198550 A1 | 8/2011 | Howard | |
| 2011/0198551 A1 | 8/2011 | Howard | |
| 2012/0258412 A1 | 10/2012 | Jackow | |
| 2012/0282559 A1 | 11/2012 | Barudi et al. | |
| 2013/0027918 A1 | 1/2013 | White | |
| 2013/0101946 A1 * | 4/2013 | Masterson | F23D 3/16 |
| | | | 431/292 |
| 2013/0114244 A1 | 5/2013 | Formico | |
| 2013/0149651 A1 * | 6/2013 | Thielvoldt | F23D 14/28 |
| | | | 431/12 |
| 2014/0134546 A1 | 5/2014 | Masterson et al. | |
| 2014/0362560 A1 | 12/2014 | Formico | |
| 2014/0366262 A1 * | 12/2014 | Flynn | B62B 3/005 |
| | | | 4/514 |
| 2014/0371927 A1 | 12/2014 | Pooladsanj | |
| 2015/0144713 A1 | 5/2015 | Formico | |
| 2016/0113094 A1 * | 4/2016 | Wagner | H05B 47/175 |
| | | | 315/307 |
| 2016/0286627 A1 * | 9/2016 | Chen | H05B 47/175 |
| 2017/0254532 A1 * | 9/2017 | Bauswell | F23N 1/005 |
| 2017/0268775 A1 | 9/2017 | Lev | |
| 2018/0072965 A1 | 3/2018 | Han | |
| 2019/0117816 A1 | 4/2019 | Dycher | |
| 2019/0242577 A1 | 8/2019 | Mann | |
| 2020/0003412 A1 * | 1/2020 | Bianchini | F23Q 3/00 |
| 2021/0071855 A1 * | 3/2021 | Pan | H05B 47/165 |

FOREIGN PATENT DOCUMENTS

| | | |
|---|---|---|
| JP | 2003343837 A | 5/2002 |
| JP | 2006289266 A | 10/2006 |
| WO | 2011046287 A2 | 4/2011 |

OTHER PUBLICATIONS

Notice of Allowance for U.S. Appl. No. 16/928,767, dated Oct. 2, 2020, 5 Pages.

International Search Report and Written Opinion for PCT Appl. No. PCT/US2020/062120, dated Apr. 15, 2021, 15 Pages.

Notice of Allowance for U.S. Appl. No. 17/752,152 dated Aug. 19, 2022, 24 pages.

Office Action for U.S. Appl. No. 17/023,957 dated Aug. 4, 2022, 49 pages.

International Search Report and Written Opinion for PCT Appl. No. PCT/US2022/013950, dated May 4, 2022, 13 pages.

Office Action for U.S. Appl. No. 17/585,463 dated May 10, 2022, 15 pages.

Notice of Allowance for U.S. Appl. No. 17/585,463, dated Jun. 23, 2022, 12 Pages.

* cited by examiner

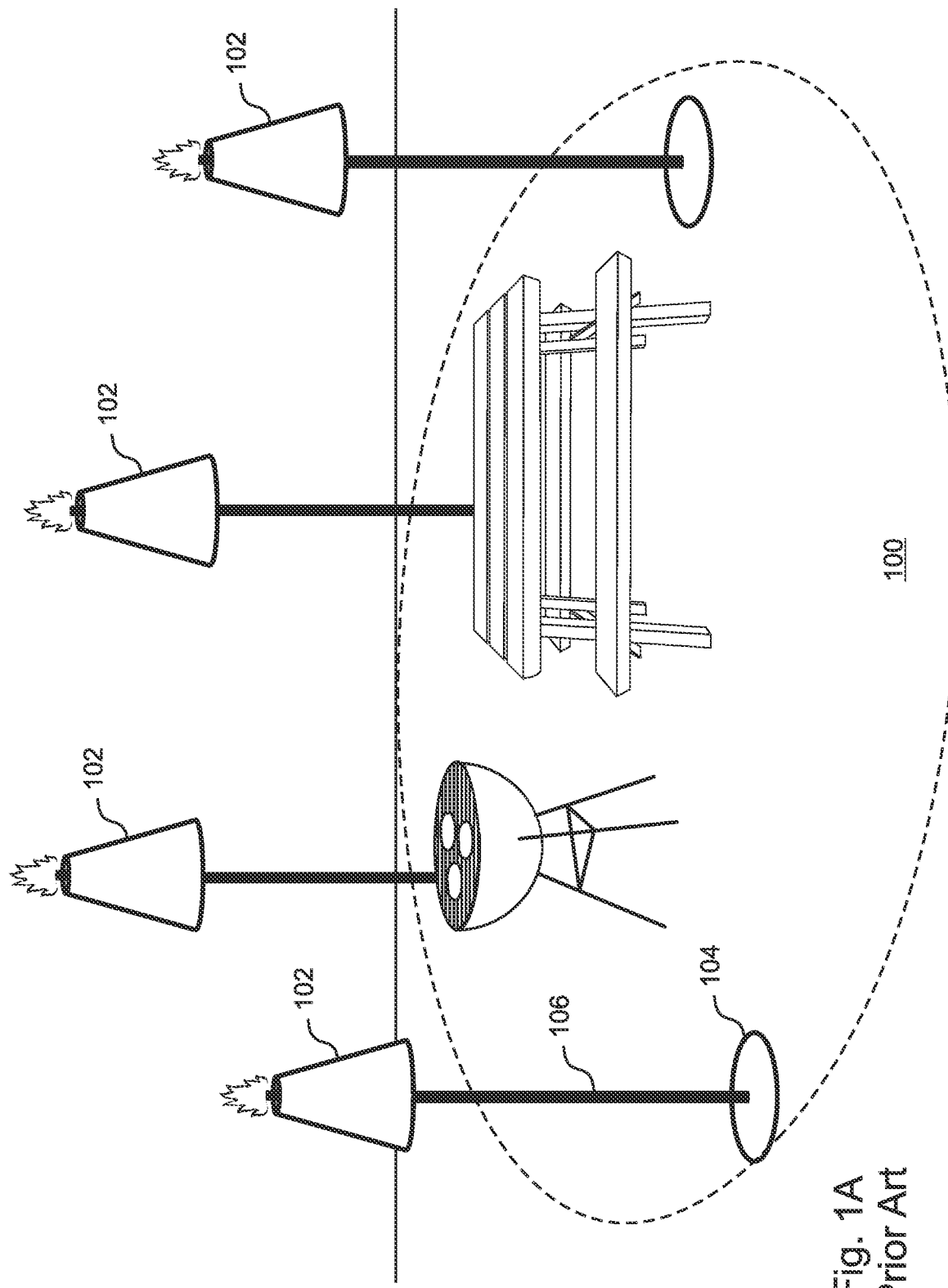

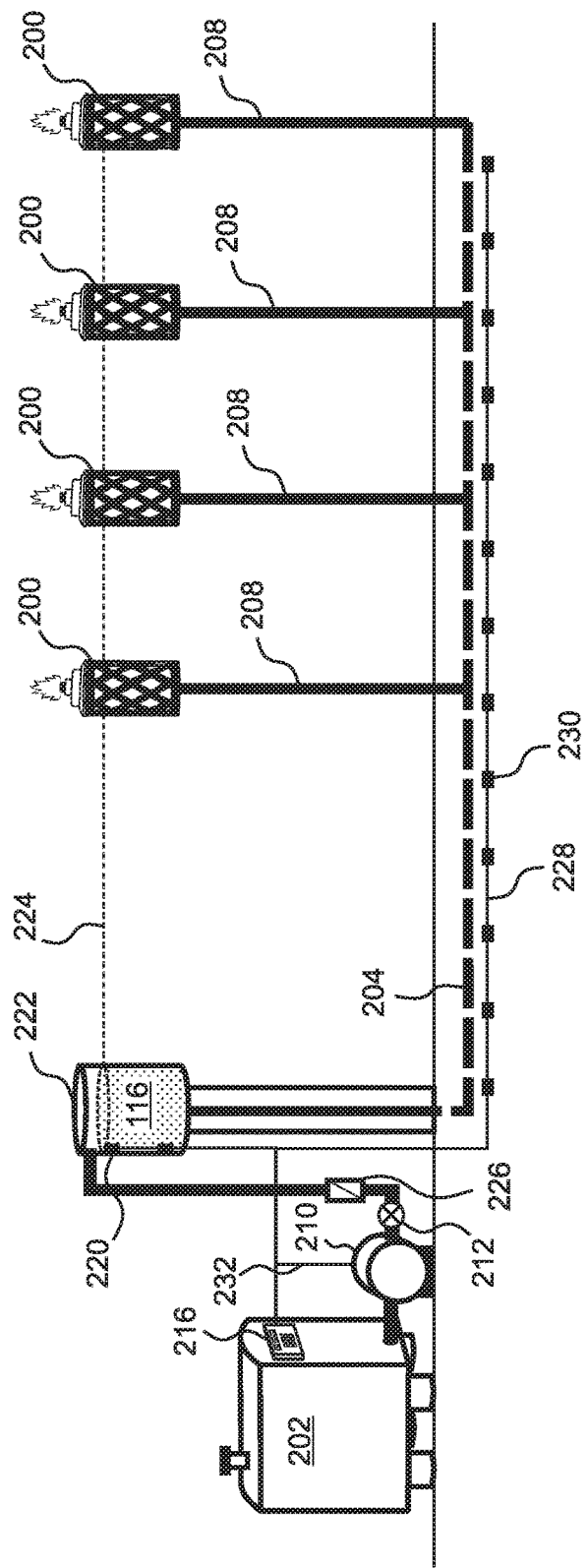

ATTACHABLE PLUG FOR ADDING FEATURES TO A TORCH SYSTEM

RELATED APPLICATIONS

This application is a continuation in part of international application PCT/US20/62120, filed on Nov. 25, 2020. Application PCT/US20/62120 claims the priority of U.S. application Ser. No. 16/928,767, filed Jul. 14, 2020, now U.S. Pat. No. 10,842,146. Application PCT/US20/62120 also claims the priority of U.S. application Ser. No. 17/023,957, filed Sep. 17, 2020. All of these applications are herein incorporated by reference in their entirety for all purposes.

FIELD OF THE INVENTION

The invention relates to apparatus for controlling and repelling insect pests, and more particularly, to torches that repel insects by burning a fuel that contains an insect repellent substance.

BACKGROUND OF THE INVENTION

The enjoyment of outdoor activities during periods of warm weather is highly popular, but is often hindered by the prevalence of insect pests, which can include swarming insects such as gnats, as well as biting insects such as black flies and mosquitos. Furthermore, mosquitos are the greatest menace for spreading diseases like dengue, malaria, yellow fever, zika, West Nile, and many others, causing millions of deaths each year. More than 35% of the world population lives in an area where the risk of diseases such as dengue is high.

According to the recent statistics of the United States CDC (Center for Disease Control and Prevention) published in the year 2019, the incidence of dengue, has risen by 30 times in the past 30 years, worldwide. The report also states that the parasite disease called limphatic filaraisis that is transmitted by repeated mosquito bites over a period of a few months affects more than 120 million people in approximately 72 different countries.

The COVID-19 pandemic, caused by the SARS-CoV-2 virus, has given rise to social distancing restrictions and individual safety preferences that have led to even greater usage of outdoor areas, both for private gatherings and for many commercial activities. For example, outdoor restaurant dining has greatly increased during the pandemic, and other businesses, including many hair salons, have been required to shift their services outdoors.

The hospitality and food service industries have been especially vulnerable to the pandemic, which has led to economic hardships for businesses and employees, and loss of significant state tax revenues. The survival of many of these restaurants and other food service companies depends heavily on the success of outdoor dining.

While it is generally assumed that the COVID-19 pandemic will not continue indefinitely, nevertheless the emergence of SARS-CoV-2 has greatly heightened public awareness of the risks that are associated with highly transmissible infectious diseases, and of the possibility that another, more virulent strain could one day appear in the future. As a result, some of the changes in social behavior that have resulted from the pandemic, such as distancing and shifting activities such as dining to outdoor areas, are likely to persist well after the present pandemic is defeated.

Global warming is also increasing the problem of insect pests in outdoor areas, because higher temperatures provide optimum conditions for mosquitoes to breed, and increases their level of activeness.

Accordingly, there is a pressing need to expand ways to provide outdoor spaces for patrons and workers with minimal risk of hinderance by insect pests.

One approach to avoiding bites by insects is to apply an insect repellent directly to the skin. However, this approach is sometimes undesirable, because of the residue that remains on the skin after the outdoor activity has concluded, as well as a reluctance to spend time applying the repellent and subsequently washing the repellent off again.

Furthermore, repellents applied to the skin may fail to provide adequate protection from insects, for example if there is an inadvertent failure to apply the repellent to certain skin regions. Furthermore, some insects, such as mosquitos, are frequently able to bite a victim through clothing, on the scalp through hair, or at a location where the hair is parted and the underlying scalp is exposed.

Many outdoor activities, such as barbecues and outdoor restaurant services, take place in relatively limited areas, such as on a deck or patio, or in a limited region that has been set aside specifically for such activities. One approach in such cases is to spray the area with an insecticide or repellent before the activity begins. Systems exist that provide permanently installed insecticide misting jets fed from a central tank of insecticide, intended for periodic, automated misting of an outdoor area with insecticide. However, insecticides are toxic and noxious, and are therefore limited to application when an outdoor area is not in use.

Furthermore, the use of pesticide spray is inappropriate in an open table dining environment, in part because insecticides can leave a toxic residue on tables, chairs, and other surfaces. In addition, pesticides are mainly effective at the time of application, because they lose most of their ability to kill pests as they disburse and dry. To the extent that pesticides may have any long-term effectiveness, that benefit is lost if the pesticide residue is washed away by rain or by lawn irrigation. For that reason, some pesticide systems include an option for a user to invoke spray on-demand for increased effectiveness during high pest periods, and/or to re-apply the pesticide after rainfall or lawn irrigation. In addition, the application of pesticides in large quantities can be harmful to the environment.

Another approach is to surround an activity area with devices that attract and electrocute insects, in the hope that any approaching insects will be lured away and destroyed before they reach the outdoor activity area. However, this approach can backfire, in that the luring features of these devices can draw additional insects to the activity area, such that even though some insects are intercepted, a large number of others continue past the devices and enter the activity area.

With reference to FIG. 1A, another, somewhat more effective method for repelling insects from an outdoor activity area 100 is to locate one or more torches 102 in the area 100 that burn a liquid fuel that is mixed with a natural and non-toxic insect repellent such as citronella. Often, the torches are supported on poles 106 that are simply inserted into the ground. Ironically, this approach can be least effective where it is most needed, which is in wet climates, because the ground can become too soft and water-saturated to support the torches, especially when rain is accompanied or followed by wind. As an alternative, the torches 102 can be permanently mounted, for example set into a cement slab, removably insertable into holes provided in an underlying hard surface, or supported by removable stands 104, which can be filled with sand or water to increase weight and stability.

As the fuel is burned in the torches 102, the repellent is continuously vaporized and disbursed throughout the activity area 100, thereby continuing to repel insects away from the area 100 for as long as the torches 102 continue to burn. Furthermore, if an activity takes place, or continues, after sunset, the light from the torches 102 can be an esthetically attractive feature. For these reasons, so-called "Tiki" torches 102 are very frequently used to repel mosquitos, fireflies, insects, and other pests. In particular, "tiki" torches 102 are highly preferred for repelling mosquitos.

With reference to FIGS. 1B and 1C, conventional insect repelling torches 102 generally include a local fuel tank 108, also referred to herein as a "fuel tank," a local fuel "reservoir" 108 or simply a "local reservoir 108." In the example of FIG. 1B the fuel tank 108 is the entire interior of the torch 102, while the torch of FIG. 1C includes a separate fuel tank 108 within an outer shell 120. The torches 102 in FIGS. 1B and 1C further include a wick port 110 through which a wick 112 is inserted into fuel 116 contained within the fuel tank 108. The fuel tank 108 is filled with fuel 116 by pouring fuel 116 manually into the fuel tank 108 before the wick 112 is ignited. The torch of FIG. 1B includes a separate fuel port 114 for filling of the fuel tank 108, while the torch 102 of FIG. 1C is filled by temporarily removing the wick 112 and filling the tank 108 through the wick port 110. The torch 102 in FIG. 1B further includes a cylindrical cavity 118 into which a pole 106 can be inserted for support of the torch 102 above the ground, while the torch 102 of FIG. 1C is permanently welded to the top of the pole 106.

While effective, conventional insect repelling torches are typically intended for occasional use and have limited capabilities. However, as the use of such torches continues to increase, not only by individuals but also by establishments such as hotels and restaurants, it can become desirable for various features of the torches to include remote wireless access, so that they can be remotely monitored and/or controlled. Generally, this can mean replacement of an existing inventory of conventional torches with new, more sophisticated torches, which is wasteful and needlessly expensive.

Also, from the point of view of a manufacturer of conventional insect repellant torches, it can be expensive to design and implement an entirely new torch system that provides features that can be remotely accessed. Of course, the design and productization of a new, sophisticated torch is expensive, and also the ongoing need to manufacture and warehouse parts for two very different torch designs represents an ongoing expense, even after the new torch is introduced into the marketplace.

What is needed, therefore, is a cost-efficient solution for implementing an insect repellant torch that provides wireless remote access to features of the torch.

SUMMARY OF THE INVENTION

The present invention is a cost-efficient solution for implementing an insect repellant torch that provides wireless remote access to features of the torch.

Specifically, the present invention is a plug, insert, or bung (referred to herein generically as a "plug") that is attachable to or attached to an outer wall of a fuel-burning torch so as to add additional, remotely accessible features to the torch. In some embodiments, the plug is permanently fixed to the torch, while in other embodiments the plug can be removed from the torch, for example if a repair or upgrade is desired.

Depending on the embodiment, and on the material properties and thickness of the wall of the torch, attachment of the plug to the torch wall can be by magnetic attachment, gluing, welding, threaded attachment, or by any other attachment means known in the art. In embodiments where the plug penetrates through the wall of the torch, the attachment can be by engagement of a male thread of the plug with a female thread provided in a corresponding hole formed in the wall of the torch. In similar embodiments, the plug includes a male-threaded portion that extends through a hole provided in the wall of the torch, and is engaged by a matching nut from within the torch so as to compress the plug against the outer surface of the torch wall. In similar embodiments, a portion of the plug extends through a hole in the torch wall and is grasped by a clip applied from within the torch interior.

In some embodiments, an O-ring or washer that is sandwiched between the torch and the plug forms a liquid-tight seal between the plug and the wall of the torch. In other embodiments, at least part of the outer surface of the plug is plastic or elastic, and the attachment of the plug to the torch is frictional, in the manner of a stopper being inserted into an opening.

The plug of the present invention includes an electronic "chip" and a power source, such as a battery and/or solar cell array, as well as wireless communication electronics, that enable remote access, i.e. remote monitoring and/or remote control, of features that are added to the torch by the plug. In embodiments, sensors extend from the plug into the interior of the torch and/or on the exterior of the torch. The sensors can include any combination of one or more temperature sensors, pressure sensors, tilt sensors, and/or fuel level sensors, as well as any other sensors that are known in the art. Embodiments further include a global positioning system (GPS) that can be monitored to determine a location of the torch. For example, a commercial organization that maintains a large quantity of torches distributed over a wide area, all equipped with an embodiment of the disclosed plug, can use the GPS feature to monitor the locations of all of the torches, for example so that a map can be automatically displayed to a user showing the deployment pattern of the torches.

In embodiments, the plug adds at least one controllable feature to the torch, such as remote control of a fuel filling valve, a remotely activated torch-igniting mechanism, and/or a remotely activated torch-extinguishing mechanism.

In embodiments, the chip that is included in the plug establishes a unique torch ID, thereby enabling each torch among a plurality of torches equipped with the plugs to be uniquely addressable by wireless means.

In various embodiments, a plurality of plugs according to the present invention are, or can be, attachable to the same torch, so as to provide flexibility as to the number and combination of features that are to be added to the torch.

A first general aspect of the present invention is a plug configured for attachment to a wall of a torch that is configured to burn a fuel. The plug includes a plug body configured for attachment to the wall of the torch, an electronic controller cooperative with the plug, a wireless communication apparatus cooperative with the electronic controller, and at least one feature in electrical communication with the electronic controller, wherein said at least one feature can be at least one of monitored and controlled remotely by wireless communication of a remote computing device with the wireless communication apparatus and controller.

In embodiments, the plug is configured for attachment to the torch by at least one of magnetic attachment, welding, and gluing.

In any of the above embodiments, the plug can include an insertable portion that is configured for insertion thereof through a hole provided in the wall of the torch. In some of these embodiments, the plug is configured for attachment to the torch by at least one of threaded engagement of male threads included on the insertable portion with female threads provided in a rim of the hole provided in the wall of the torch, attachment by friction between the insertable portion and the rim of the hole provided in the wall of the torch, and clamping of the plug to the wall of the torch by insertion of the insertable portion through the hole provided in the wall of the torch and engagement of male threads included on the insertable portion with a nut applied to the insertable portion from within the torch.

In any of the above embodiments, the plug can be configured to form a liquid-tight seal with the wall of the torch.

In any of the above embodiments, the at least one feature can include a fuel level sensor.

In any of the above embodiments, the at least one feature can include a temperature sensor.

In any of the above embodiments, the at least one feature can include a pressure sensor.

In any of the above embodiments, the at least one feature can include a tilt sensor.

In any of the above embodiments, the at least one feature can include a torch igniting mechanism.

In any of the above embodiments, the at least one feature can include a torch extinguishing mechanism.

In any of the above embodiments, the at least one feature can include a wick advancing mechanism.

In any of the above embodiments, the at least one feature can include a global positioning system.

In any of the above embodiments, the controller can be configured to establish a unique electronic torch id, whereby the at least one feature can be controlled and/or monitored by the remote computing device even if the remote computing device is in wireless communication with a plurality of plugs according to claim 1 that are attached to a corresponding plurality of torches.

In any of the above embodiments, the plug can be configured for attachment to a wall of a torch that is configured to burn a liquid fuel. In some of these embodiments, the liquid fuel contains an insect repellant substance.

In any of the above embodiments, the plug can be configured for attachment to a wall of a torch that is configured to burn a gaseous fuel.

A second general aspect of the present invention is a method of adding at least one feature to a fuel-burning torch. The method includes providing a plug according to any embodiment of the first general aspect, and attaching the plug to the fuel-burning torch, thereby implementing the at least one feature that is included with the plug.

And in embodiments, the plug is attached to the fuel-burning torch during manufacturing thereof.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1A illustrates use in the prior art of torches that burn a fuel mixed with an insect repellent to exclude insect pests from an outdoor activity area, where the torches are self-contained and cannot be refilled with fuel while burning or while hot from recent use;

FIG. 2E is a side view of an embodiment of the present invention in which fuel is gravitationally supplied to the local fuel tank from a remote elevated tank;

DETAILED DESCRIPTION

Figure 1B:
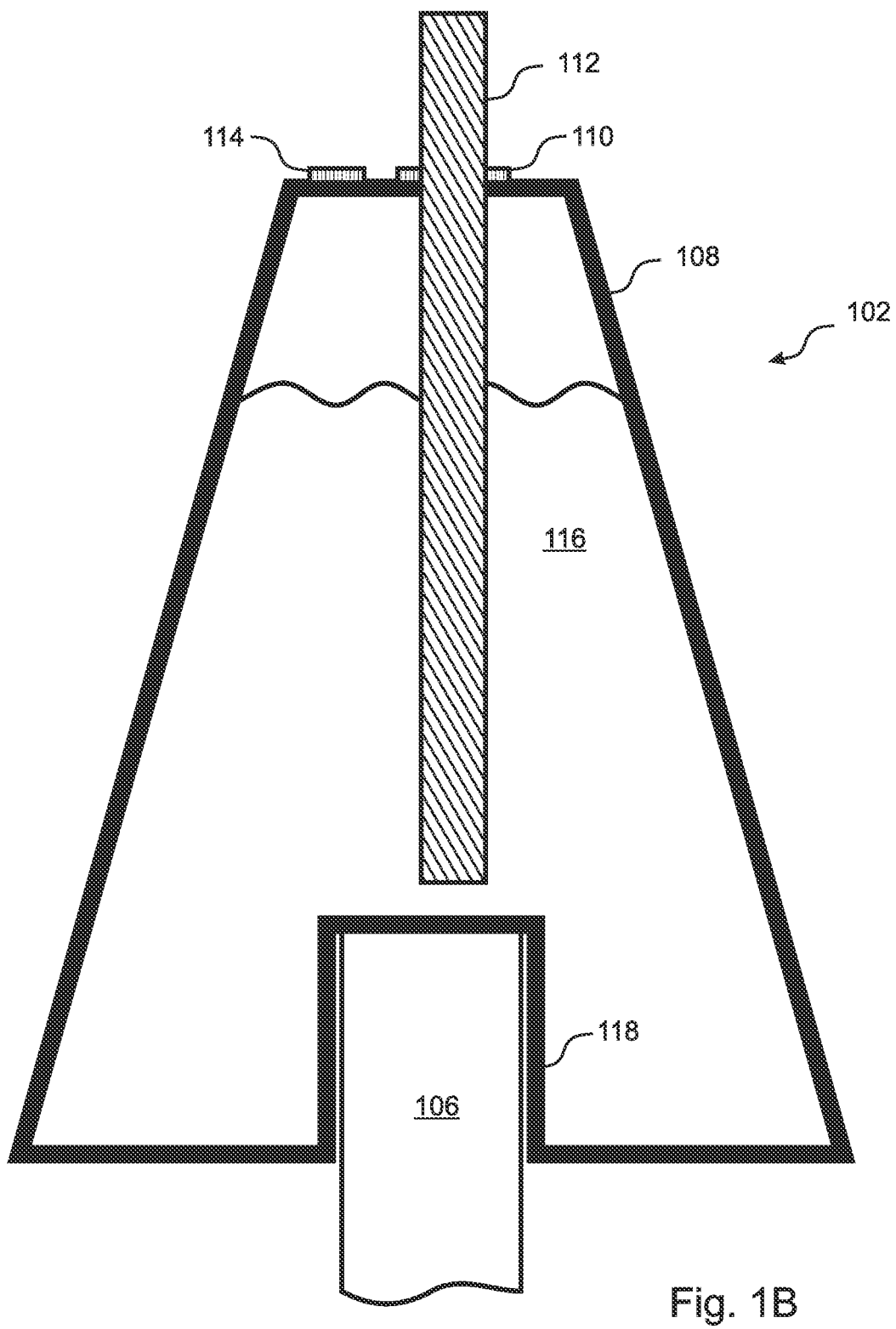
FIG. 1B is a cross-sectional view of a representative insect repelling torch of the prior art for which the shell of the torch functions as the fuel tank.
Figure 1C:
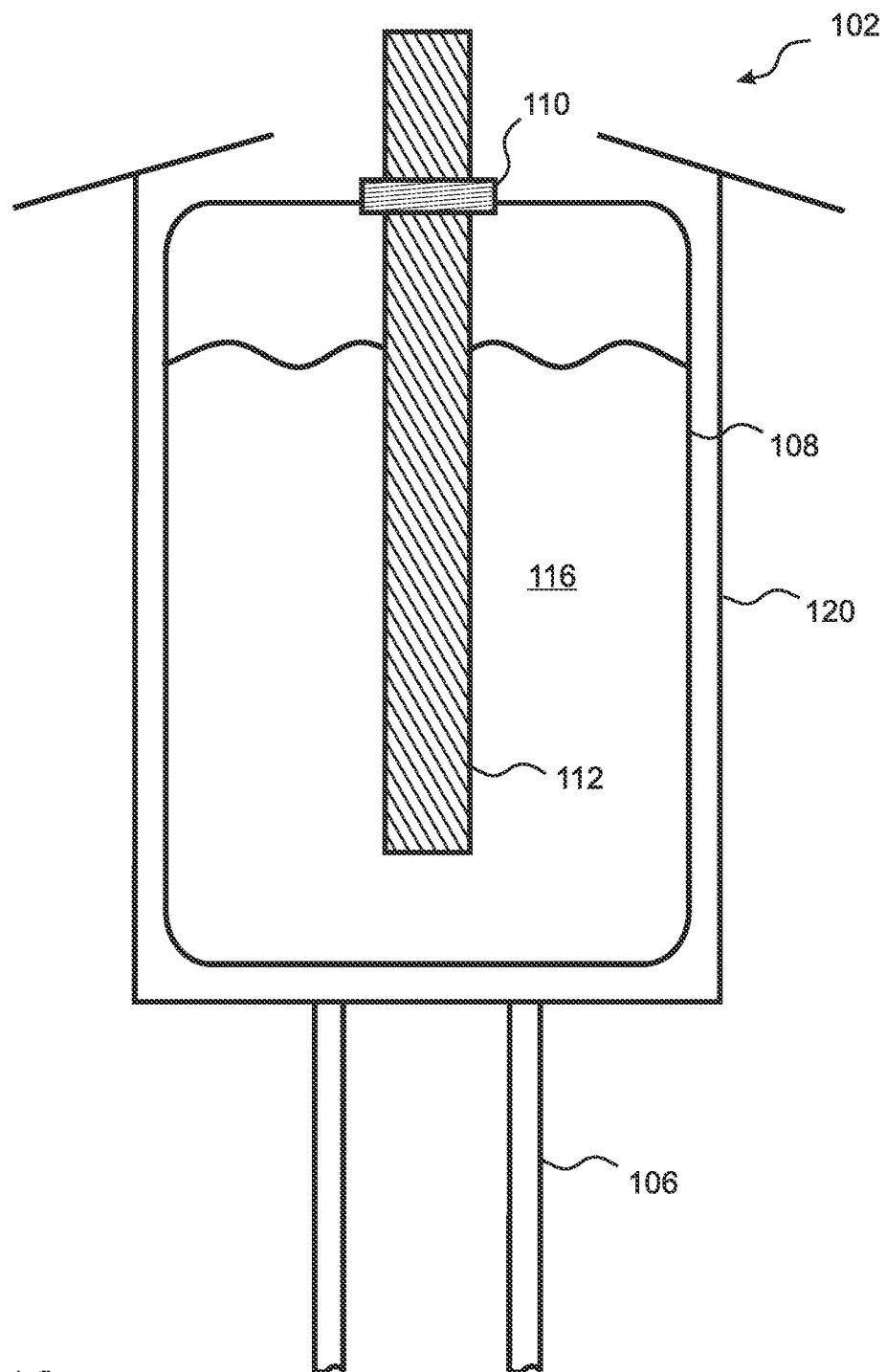
FIG. 1C is a cross-sectional view of another representative insect repelling torch of the prior art that includes a separate fuel tank within an outer shell.

The present invention is a cost-efficient solution for implementing insect repellant torches that provide wireless remote access to features of the torch. Embodiments of the invention can be installed as an upgrade to previously manufactured torches, such as conventional torches that are self-contained and do not provide remote access. With reference to FIGS. 2A-2G, embodiments of the present invention are applicable to systems that include one or more liquid fuel-burning torches 200, where all of the torches 200 are in fluid communication with a central reservoir 202 of liquid fuel 116, a fuel pump 210, and a fuel valve 212 via a fuel plumbing system that can include hollow standpipes 208 supporting the torches 200, as well as other hoses or pipes 204.

Figure 2A:
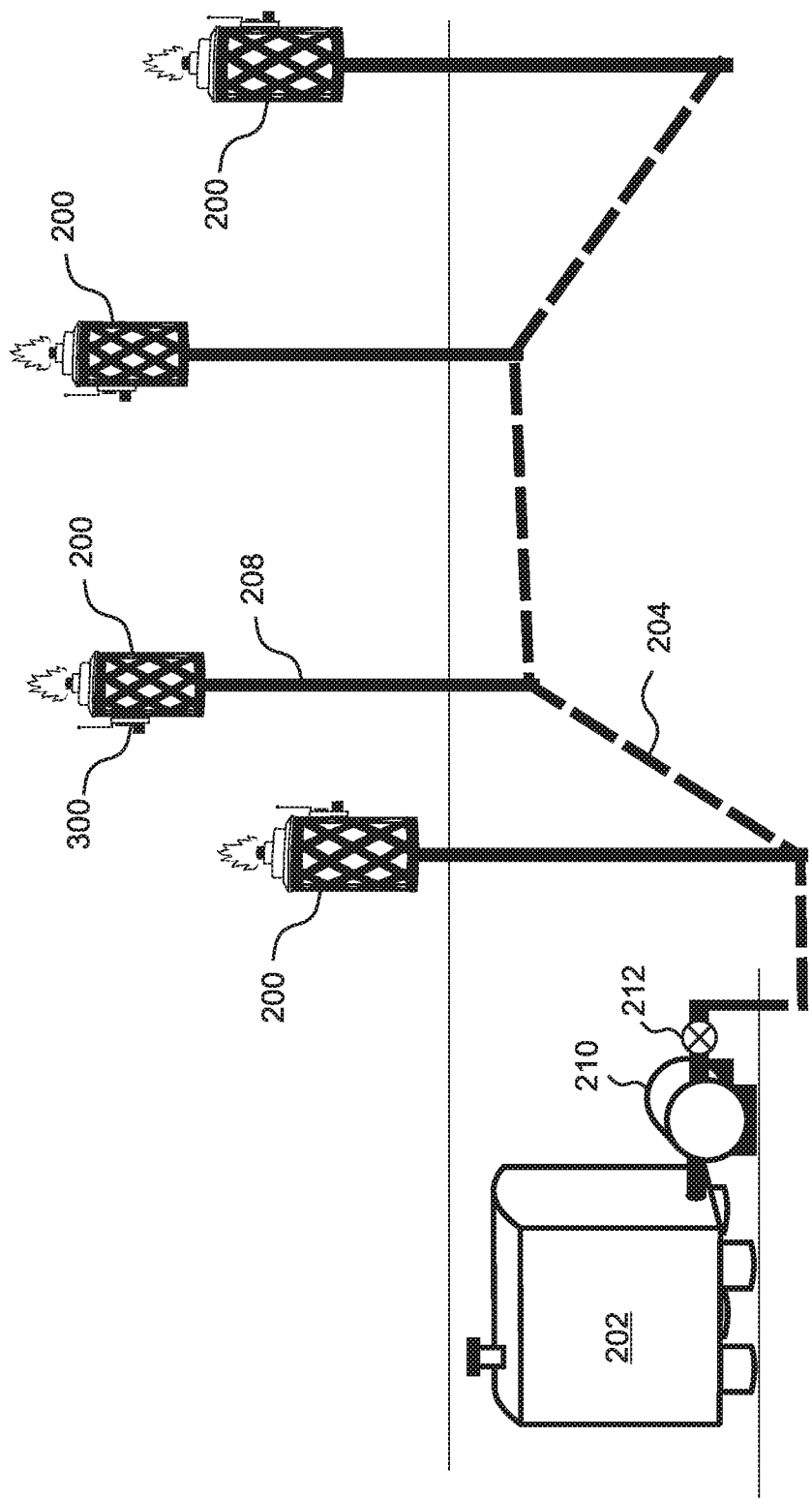
FIG. 2A is a perspective view of an outdoor activity area surrounded by torches according to an embodiment of the present invention where the fuel plumbing system interconnects the torches in series.
Figure 2B:
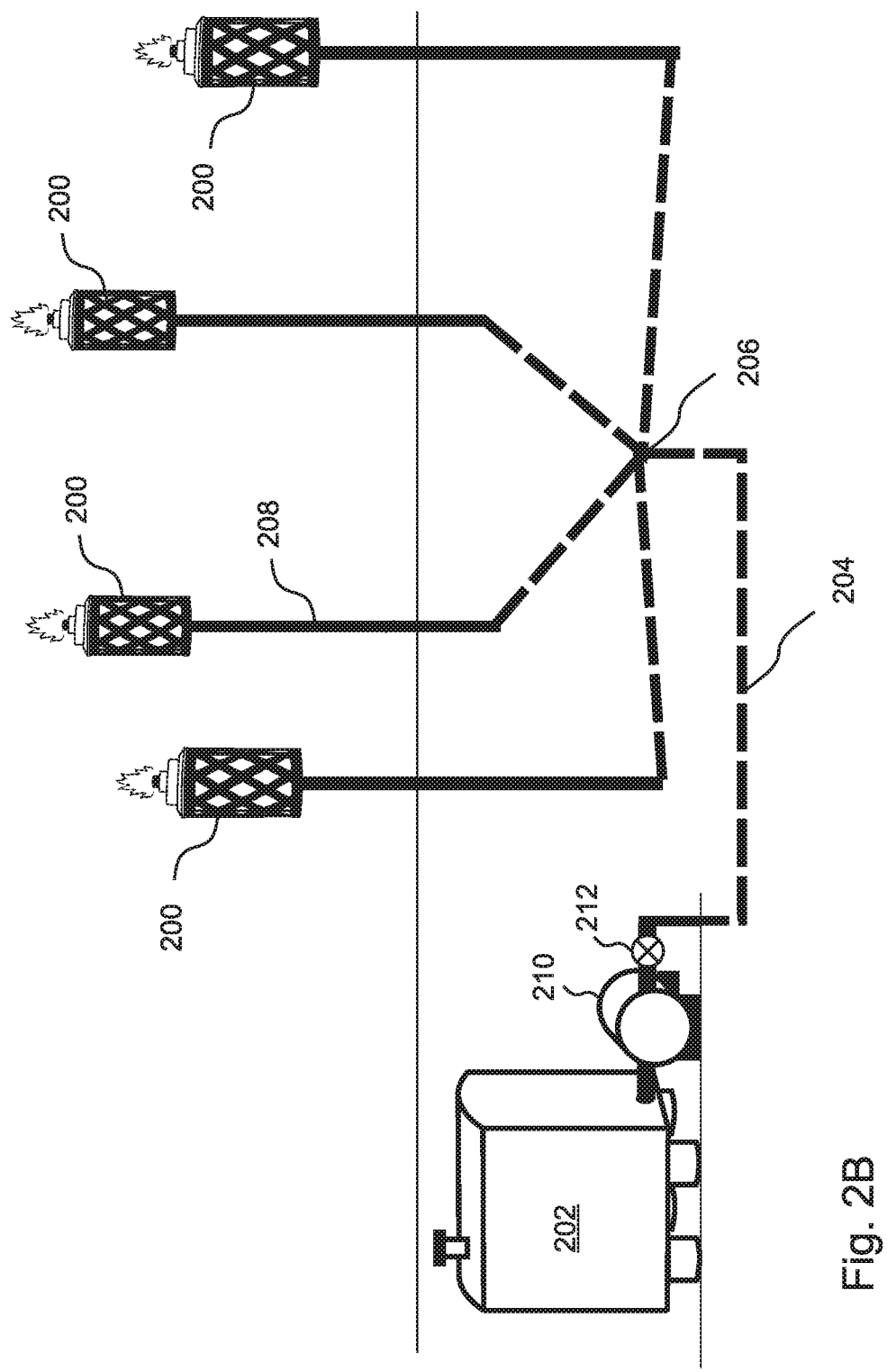
FIG. 2B is a perspective view of an outdoor activity area similar to FIG. 2A except that the fuel plumbing system interconnects the torches to a common hub in a "star" configuration.
Figure 2C:
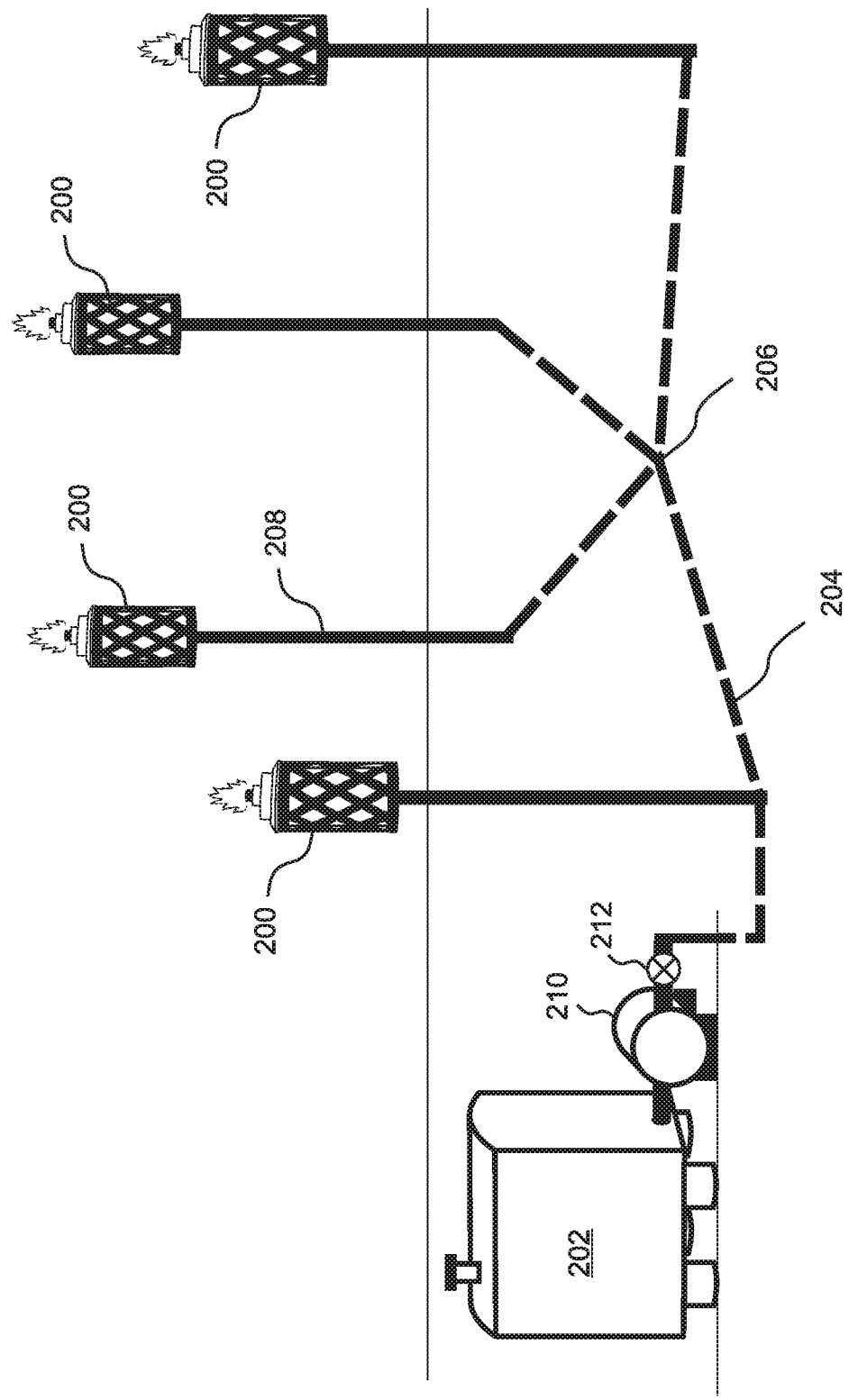
FIG. 2C is a perspective view of an outdoor activity area similar to FIG. 2A except that the fuel plumbing system interconnects the torches in a mixed series and star configuration.

In embodiments that include a plurality of torches 200, the fuel plumbing system 204, 208 interconnects all of the torches 200 with the central reservoir 202, for example by connecting the torches 200 in series, as shown in FIG. 2A, by connecting all of the torches 200 to a central "hub" 206, as shown in FIG. 2B, by a combination thereof, as shown in FIG. 2C, or by any other plumbing configuration known in the art that can supply fuel 116 from the central reservoir 202 to the torches 200. As indicated in FIGS. 2A through 2C, the fuel plumbing system can include standpipes 208 that support the torches 200, as well as pipes or hoses 204 that are partially or fully installed in trenches or conduits that are below ground and/or under or within a cement slab or other foundation.

In these embodiments, an automatic fuel refueling system refuels the torches 200 from the central reservoir 202 as needed, either be elevating the central reservoir to a height that is above the torches, or by using a pump 210 to deliver fuel 116 to the torches 200, so that the torches 200 can continue burning almost indefinitely. A valve 212 can be included proximal to the pump 210 and/or central reservoir 202, which can be or can include a one-way valve that prevents fuel 116 from flowing from the fuel plumbing system 204, 208 back through the pump 210 when the pump 210 is not operating.

By mixing an insect repellent substance such as citronella with the fuel 116 that is supplied to the torches 200, the disclosed apparatus and method can be used to repel insect pests away from areas 100 that are proximal to the torches 200 for very long periods of time. A period of protection can be extended even further by re-filling the central reservoir 202 with fuel 116, where said refueling can be performed while the torches 200 are in operation.

With continuing reference to FIGS. 2A through 2C, the torches 200 can be mounted on standpipes 208 or other structures that can be permanently deployed in the ground, or for example in a cement slab, or the standpipes 208 can be removably mounted in holes or other permanent support structures that are provided in the outdoor recreation area 100, or on removable stands 104 that can be filled with sand or water to increase their weight and stability.

Figure 2D:
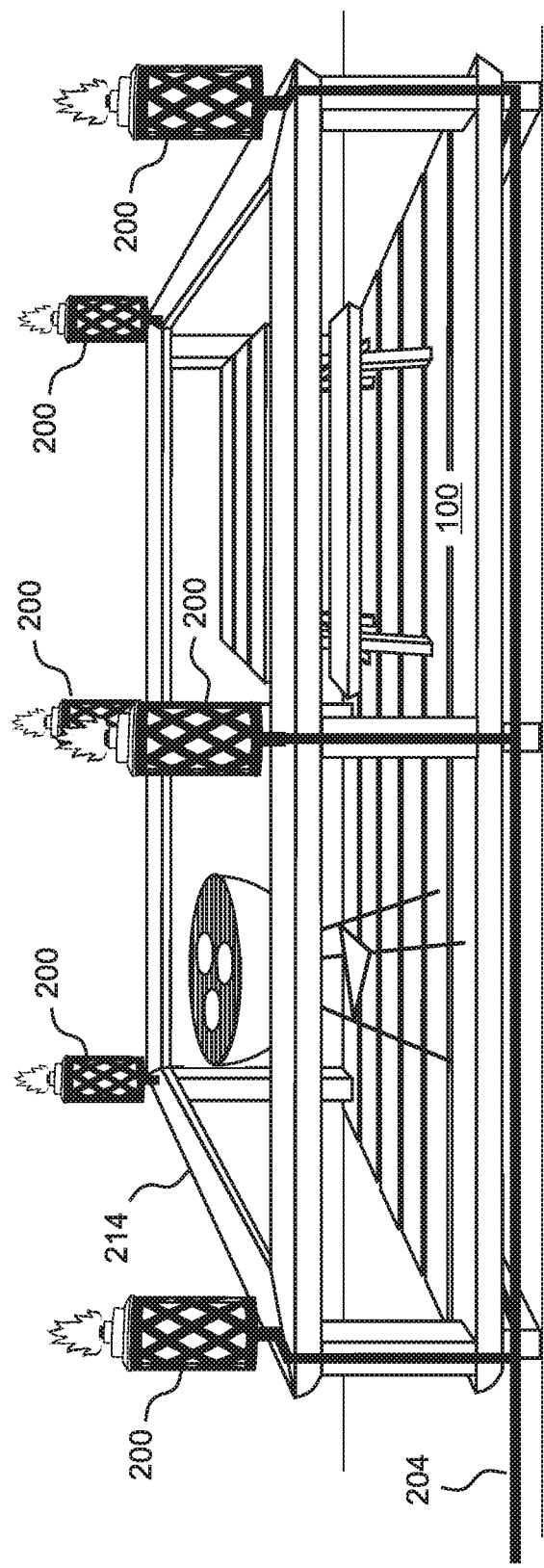
FIG. 2D is a perspective view of an embodiment of the present invention where the torches are mounted to railing structures included in an outdoor activity area.

In other embodiments, with reference to FIG. 2D, the fuel plumbing system 204, 208 is provided either partially or completely above ground. For example, conduits containing fuel lines of the fuel plumbing system 204, 208 can be cooperative with structures such as decks, fences, railings 214, and benches that are included in the outdoor activity area 100, so that tripping hazards are avoided.

In the gravity fed embodiment of FIG. 2E, an elevated tank 222 is maintained at an elevation that corresponds with the heights of the local fuel tanks 108. According to this approach, it is not necessary to include separate valves and level sensors in each of the torches 200. Instead, the levels 224 of fuel 116 in all of the local fuel tanks 108 will mimic and correspond with the level 214 of fuel 406 in the elevated tank 222, such that monitoring and controlling the level 224 of fuel 116 in the elevated tank 222 using sensors 220 in the elevated tank 222 will automatically cause the fuel levels 224 in the local fuel tanks 108 to be maintained. This approach is applicable, in particular, when all of the torches 200 are installed at the same height. In addition to a shut-off valve 212, the embodiment of FIG. 2E further includes a check valve 226 that prevents fuel 116 from flowing from the fuel plumbing system 204, 208 back through the pump 210 when the pump 210 is not in operation.

A fuel leakage sensing system 228 is also provided in the embodiment of FIG. 2E that includes a plurality of sensors 230 in close proximity to the hoses of the fuel plumbing system 204, 208. For example, the fuel leakage sensing system 228 can be located within a trench or conduit through which hoses 204 of the fuel plumbing system 204, 208 are routed. If a fuel leak is detected, the controller 216 is immediately alerted by the fuel leakage sensing system 228, and responds by alerting a user and by interrupting the power 232 that is supplied to the pump 210, thereby stopping operation of the pump 210. If a trench or conduit is used, the trench or conduit can serve to prevent escape of any small amount of fuel 116 that might have leaked before the pump was stopped. Embodiments include additional remotely-controlled valves (not shown), for example at the bases of torch support structures and/or the base of the support structure of the elevated tank 222, that can be closed in the event of a fuel leak to prevent fuel 116 contained in the local fuel tanks 108, elevated tank 222, or any other part of the fuel plumbing system 204, 208 from flowing out through the leak.

Figure 2F:
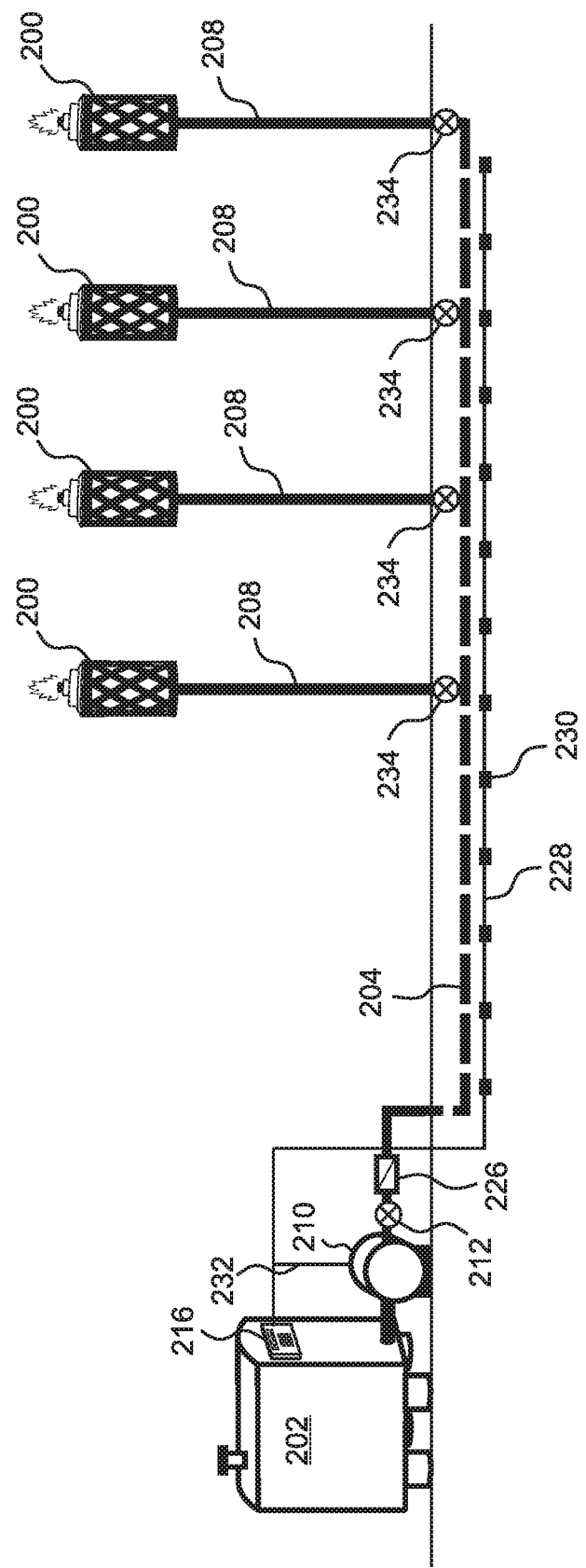
FIG. 2F is a side view of an embodiment of the present invention in which fuel is maintained at a constant pressure upstream of the torches, and in which a pressure control valve is installed at the base of each torch pole and configured to maintain a constant height of fuel above the pressure relief valve, thereby maintaining fuel within the torch.

With reference to FIG. 2F, in some embodiments fuel pressure control valves 234 are installed below each of the torches 102, and the pumping system 210, 212, 226 is configured to maintain a constant fuel pressure upstream of the pressure control valves 234. The opening pressure of each of the pressure control valves 234 is adjusted so as to maintain a desired height of fuel 116 in a column above the valve 234, thereby maintaining fuel within the torch 102. In some of these embodiments, a low fuel sensor is included in at least one of the torches 102, and is used to signal when the fuel 116 should be pressurized upstream of the valves 234. In other embodiments, the pressure of the fuel 116 upstream of the valves 234 is maintained at a desired pressure at all times, and open/closed hysteresis of each of the pressure control valves 234 causes the valve to open when the fuel 116 in the associated torch 102 is nearly depleted, and to close when the local fuel reservoir 108 is nearly full.

Figure 2G:
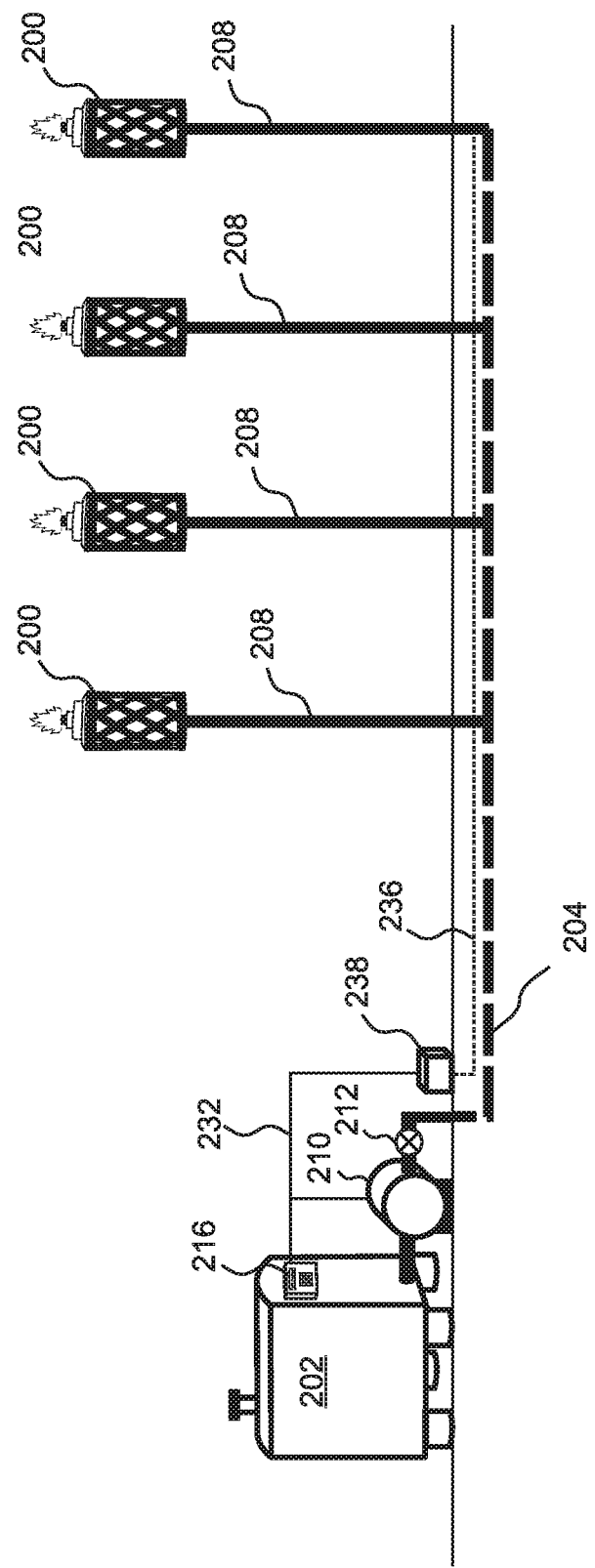
FIG. 2G is a side view of an embodiment of the present invention in which fuel is maintained under pressure in the fuel plumbing system by a pump, and each torch includes a level sensor and electrically controlled valve that is opened to refill the local fuel tank as needed.

With reference to FIG. 2G, in other embodiments each of the torches 200 includes a local valve 238 and one or more level sensors 702 that monitor the fuel 116 in the local fuel tank 108. In embodiments, the fuel level sensors can be ultrasonic sensors 702 included in the local fuel tank 108. In these embodiments, fuel is maintained under pressure in the fuel plumbing system 204, 208 so that the local fuel tank 108 is refilled whenever the local valve 700 is opened. In some embodiments, such as FIG. 7A, the level sensors 702 in the torches 200 communicate with a central controller 216, which can be located proximate to the central reservoir 202, and the central controller 216 transmits signals to the torches 200 which open and close the local valves 700 in the torches as needed to maintain fuel in the local fuel tank 108. Signal lines that extend from within each torch 200 to the central controller 216 in parallel with fuel pipes of the fuel plumbing system 204, 208 direct signals from the level sensors 318 to the central controller 216. In embodiments, the signal lines can include, or can be, an ethernet cable, and in some embodiments power is provided to the torches via an ethernet cable using "power over ethernet."

In the embodiment of FIG. 2G, low voltage power is provided by a transformer 238 proximal to the pump 210 at a relatively low voltage from an outdoor low voltage power supply that meets National Electrical Code (NEC) NFPA 70 for safe electrical design and installation, as is adopted in all 50 states of the United States. The low voltage power can be directed through a low voltage power line 236 to the torches 200 in parallel with the pipes and/or trenches of the fuel plumbing system 204

Embodiments of the present invention can be implemented by manufactures of conventional torches that lack remote wireless access, so as to enable the manufacturers to produce remotely accessible torches with minimal changes to existing designs, parts inventory and manufacturing processes, thereby maintaining an economy of scale for parts and assembly steps that are common to both the pre-existing torch designs and to new, remotely accessible torches that implement the present invention, thereby reducing the manufacturing and support costs of the remotely accessible torches.

Figure 3A:
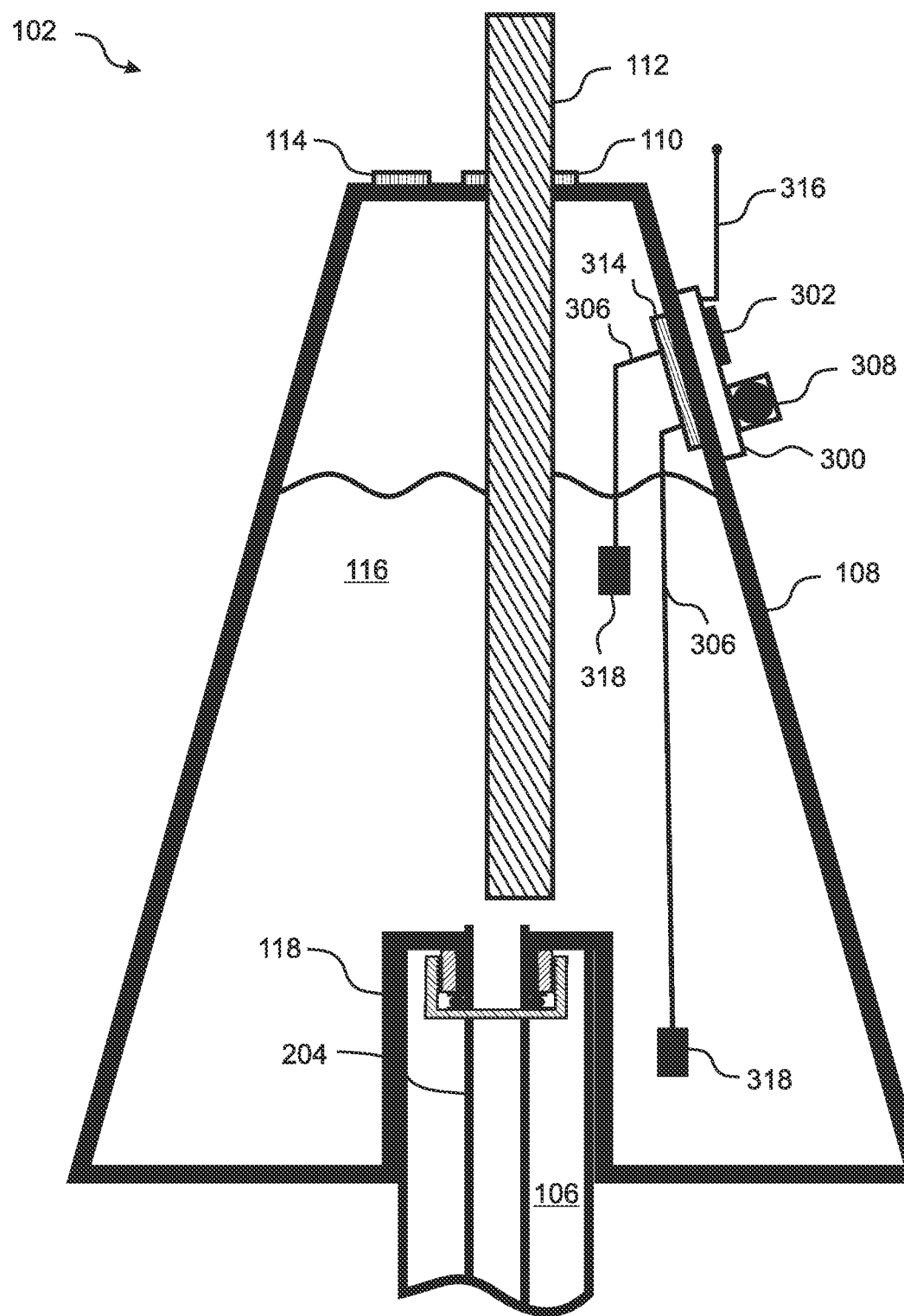
FIG. 3A is a cross-sectional view of an embodiment that includes an attached plug from which two fuel level sensors extend into the local fuel tank of the torch.
Figure 3B:
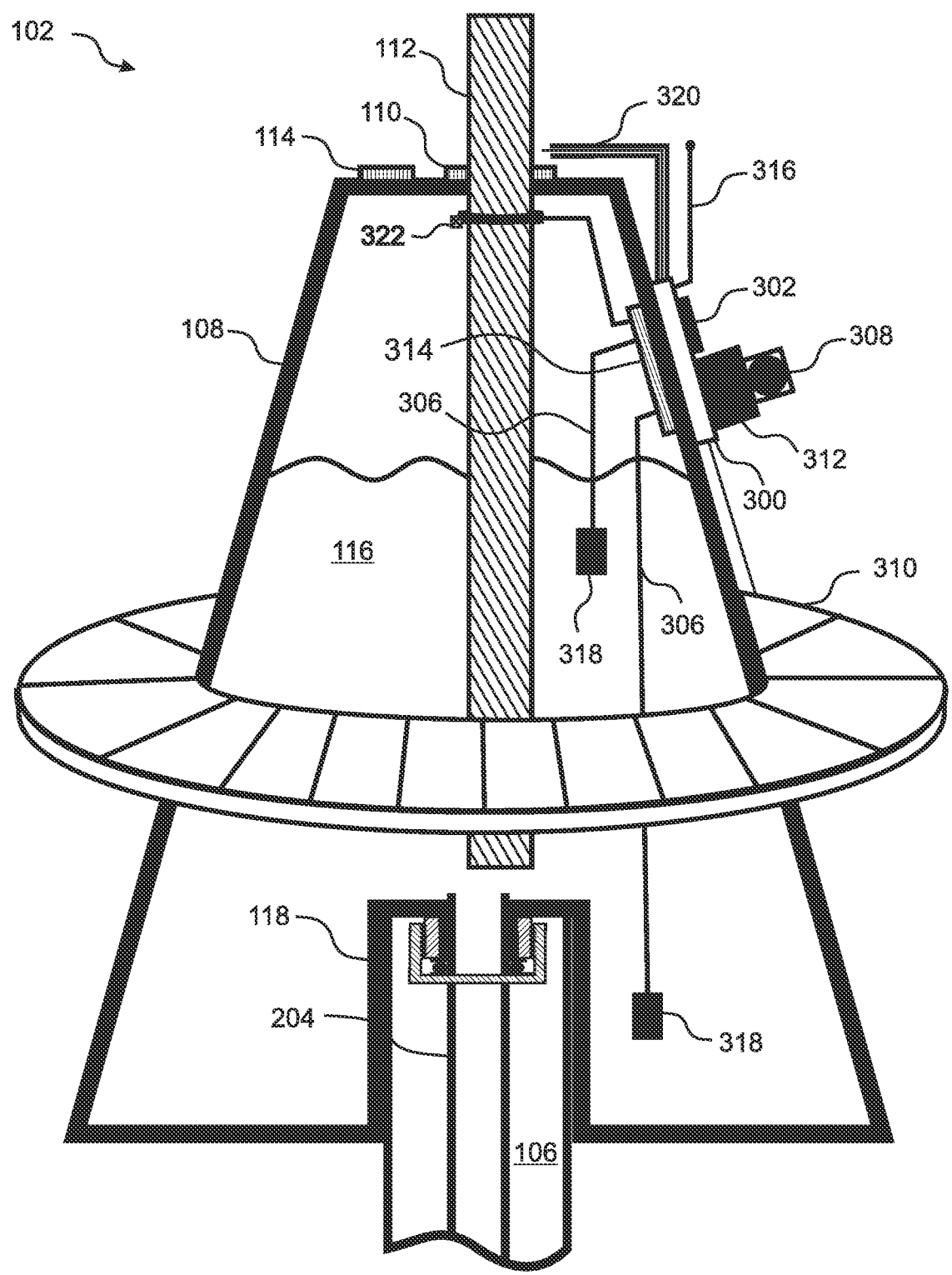
FIG. 3B is a cross-sectional view of an embodiment similar to FIG. 3A that includes a solar panel that recharges a battery that provides power to the plug.

With reference to FIGS. 3A and 3B, the present invention is, or includes, a plug, insert, or bung 300 (referred to herein generically as a plug 300) that is attachable to an outer wall 108 of a fuel-burning torch 102 so as to add at least one additional feature to the torch. Depending on the embodiment, and on the material properties and thickness of the wall 108 of the torch 102, attachment of the plug 300 to the torch wall 108 can be by magnetic attachment, gluing, welding, or any other attachment means as are known in the art. In some embodiments the plug 300 is permanently fixed to the wall 108 of the torch 102, while in other embodiments the plug 300 can be removed from the torch 102, for example if a repair or upgrade is desired.

In the embodiments of FIGS. 3A and 3B, the torch 102 is a liquid fuel burning torch. The plug 300 penetrates through the wall 108 of the torch 102, and is attached to the wall 108 by engagement of a male thread 314 of the plug 300 with a female thread provided in a corresponding hole formed in the wall 108 of the torch 102. In other embodiments the outer rim of the plug 300 is plastic or elastic, and the attachment is frictional, in the manner of a stopper being inserted into an opening. In still other embodiments, the plug 300 includes a male-threaded portion 314 that extends through a hole provided in the wall 108 of the torch 102, and is engaged by a matching nut from within the torch 102 so as to compress the plug against the outer surface of the torch wall 108. In still other embodiments a portion of the plug 300 extends through a hole in the torch wall and is grasped by a clip applied from within the torch interior. In embodiments, an O-ring or washer (not shown) is provided so as to form a liquid-tight seal between the plug 300 and the wall 108 of the torch 102.

With continuing reference to FIGS. 3A and 3B, the plug 300 includes an electronic "chip" 302 and a power source, such as a battery 308 and/or solar cell array 310, as well as wireless communication apparatus 316 that provides remote monitoring of the torch, and in embodiments also control of the features that are added to the torch 102 by the plug 300. The wireless communication can be, for example, via Bluetooth, low power, wide range Wi-Fi (LoRaLan), 802.11 wireless internet, and/or cellular communication.

In the embodiment of FIGS. 3A and 3B, the plug 300 extends into the local fuel tank 108 of the torch 102, and rigid leads 306 extend from the plug 300 into the torch interior. Fuel level sensors 318 are suspended from the rigid leads 306, so that they hang down into the local fuel supply and are able to provide signals that indicate when the torch should be refilled with fuel and when it is full and no more fuel should be added. Similar embodiments include any combination of sensors, such as a temperature sensor, a pressure sensor, and/or a "tilt" sensor that can determine if the torch has been shifted away from a vertical orientation.

In the embodiment of FIG. 3B, the plug 300 further adds an automatic wick ignitor 320 to the torch 102 as an added control feature. A large capacitor 312 is included with the plug 300 that is configured to accumulate a high voltage that can be suddenly discharged to cause the ignitor 320 to emit a spark that will ignite the torch fuel 116. Similar embodiments add one or more other control features to the torch, such as remote control of a fuel filling valve and/or a remotely activated torch-extinguishing mechanism.

In addition, the embodiment of FIG. 3B further includes a remotely controlled wick clamp 322 that is configured to transition under remote control between clamping the wick 112 in place relative to the top of the torch 102 and allowing the wick 112 to be raised and lowered relative to the top of the torch 102, for example to adjust the burning rate of the fuel 116. In various embodiments, the wick clamp 322 further includes a wick advancing mechanism that can raise and lower the wick 112 relative to the top of the torch 102 under remote control.

Figure 4:
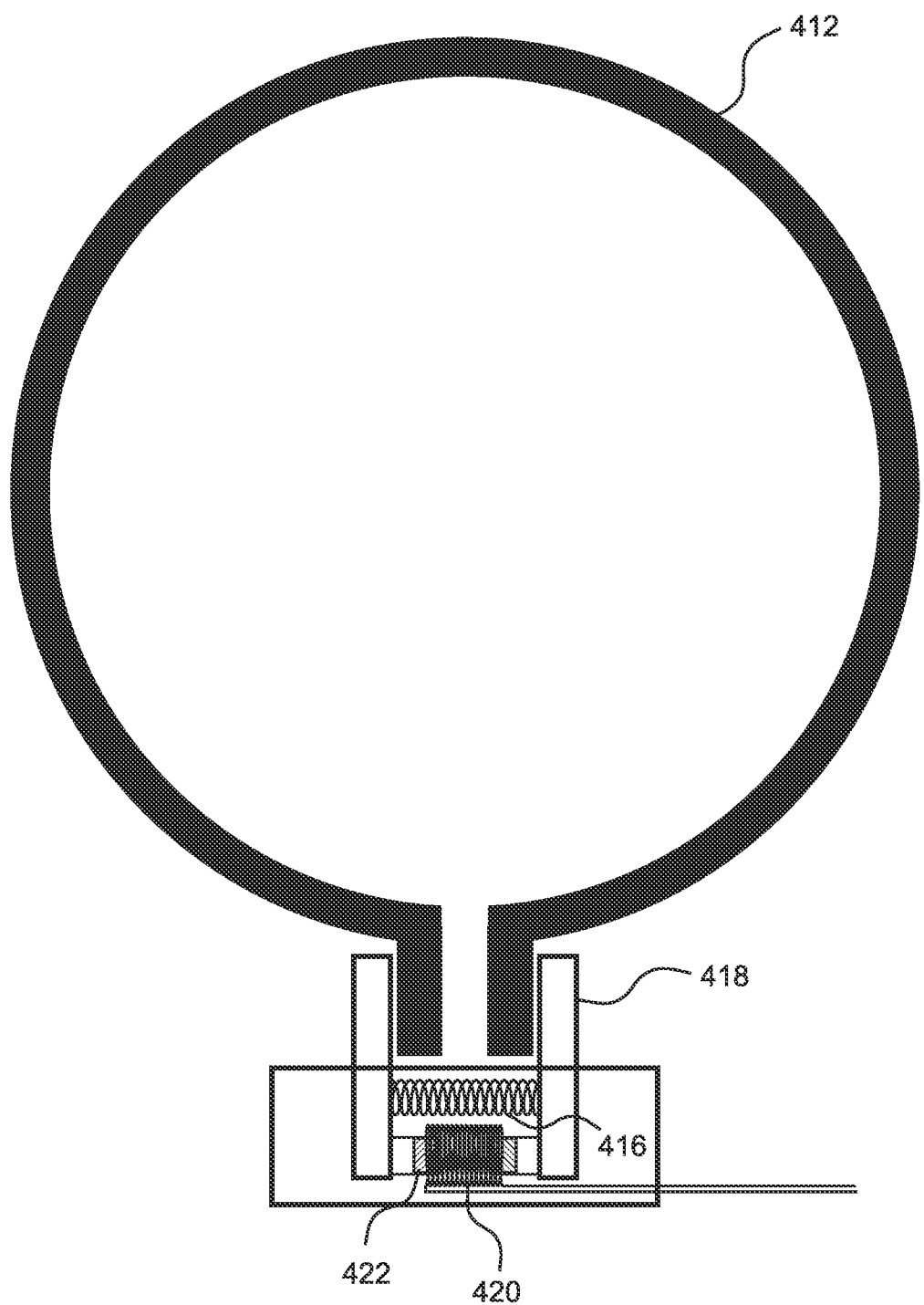
FIG. 4 is a close-up top view of the split-ring wick seal of FIG. 7D.

FIG. 4 is a close-up top view of the wick clamp 322 of FIG. 3B. In the illustrated embodiment, the wick clamp 322 includes a split ring 412 that is normally held in a clamped configuration by a tension spring 416 acting on a pair of clamping arms 418. However, when adjustment of the height of the wick is desired, or for any other reason, the split ring 412 can be temporarily released by passing electrical current through a coil 420, thereby repelling a pair of magnets 422 that are also cooperative with the clamping arms 418, and overcoming the tension applied by the spring 416.

In embodiments, the chip 302 that is included in the plug 300 establishes a unique electronic torch id, thereby enabling each torch 102 among a plurality of torches 102 equipped with the plugs 300 to be uniquely addressable by wireless means.

In various embodiments, a plurality of plugs 300 are, or can be, attached to a given torch 102, so as to provide flexibility as to the number and combination of features that are to be added to the torch 102.

Figure 5:
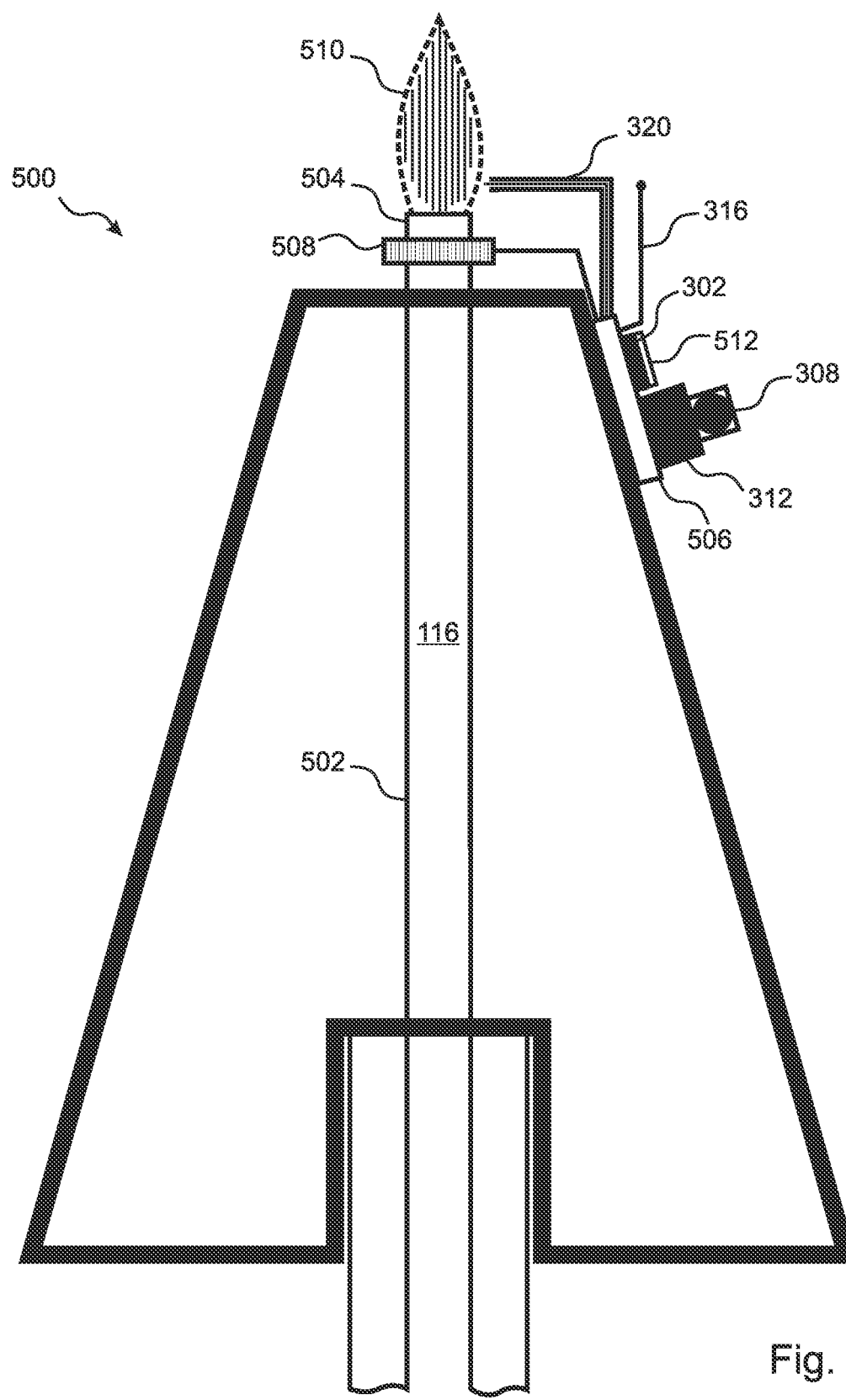
FIG. 5 is a cross-sectional view of an embodiment of the present invention installed on a gas-burning torch.

With reference to FIG. 5, it should be noted that the present invention is not limited to only insect-repelling torches, nor is it limited only to torches that burn a liquid fuel. FIG. 5 is a cross-sectional illustration of a gas-burning torch 500 that does not include a local fuel reservoir or a wick 112. Instead, the interior of the torch 500 includes a gas plumbing system 502 terminating in a gas jet 504 that extends above the top of the torch 500. In the illustrated embodiment, the plug 506 is attached to the torch 500 without penetrating the wall of the torch 500. The plug 500 implements a wick igniting system 302 as well as a GPS system 512 and a temperature sensor 508 that can be used to determine if the flame 510 is active. In embodiments, the gas flow to the torch 500 is automatically shut off if the temperature sensor 508 determines that the flame 510 is not ignited.

Figure 6:
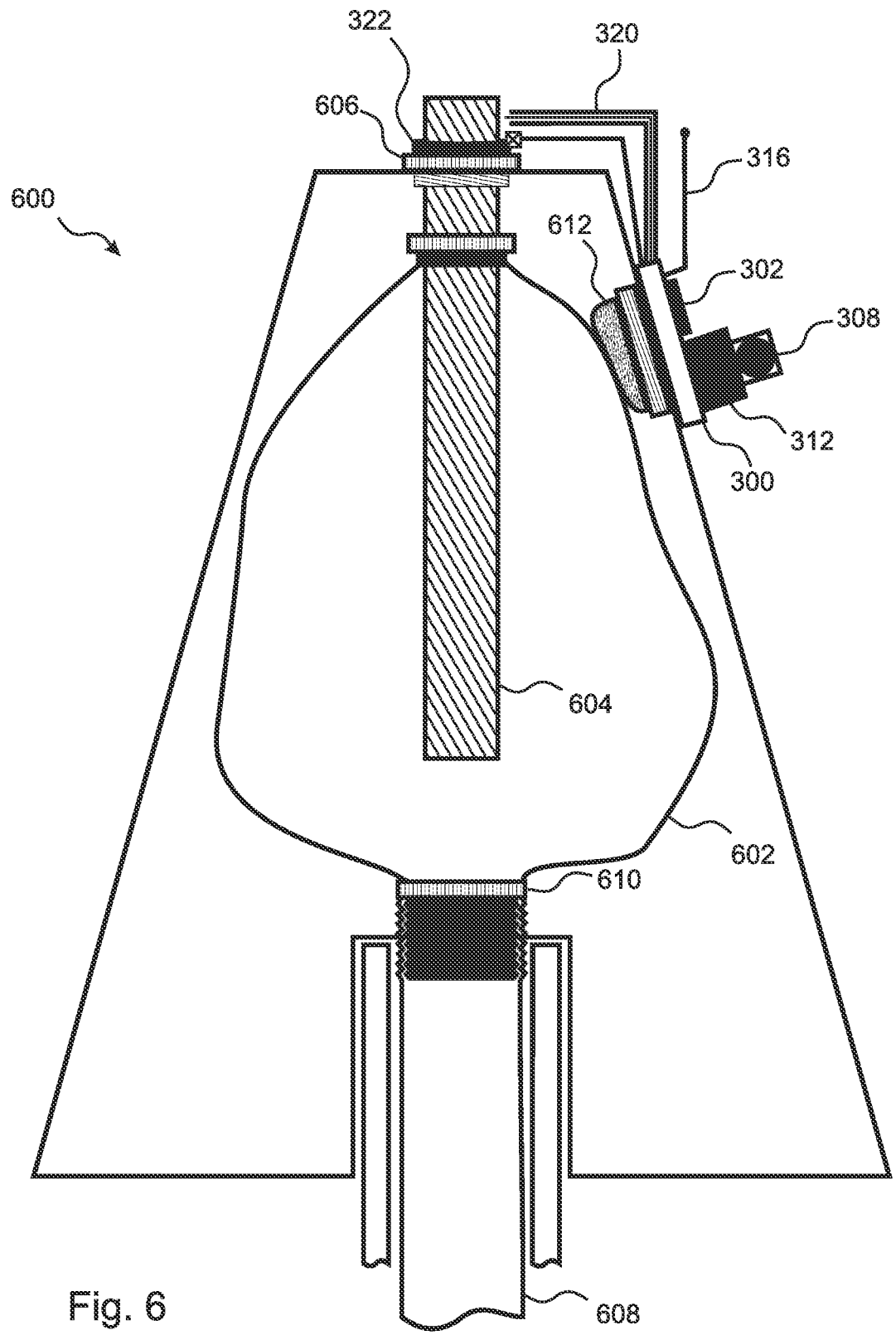
FIG. 6 is a cross-sectional view of an embodiment of the present invention installed on a torch that has been upgraded from a gas burning torch to a liquid fuel burning torch by installation therein of a torch upgrade kit.

As is noted above, embodiments of the present invention are useful to manufacturers of torches, enabling a manufacturer to enhance an existing torch design by adding new, wirelessly accessible features, rather than implementing an entirely new torch design that would require additional development cost, as much as a greater inventory cost. FIG. 6 is a cross sectional illustration of a torch 600 that is based on a manufacturer's design for a gas-burning torch similar to the torch 500 of FIG. 5. The manufacturer has converted the torch to burn a liquid fuel by omitting the gas fuel plumbing 502 and instead installing an upgrade kit within the shell of the torch 600. The upgrade kit is described in more detail in U.S. patent Ser. No. 10/842,146 and international application PCT/US20/62120, both of which are by the present Applicant, and both of which are incorporated herein by reference in their entirety for all purposes.

The upgrade kit in FIG. 6 includes an inflatable fuel reservoir 602 and a wick 604 that extends from the fuel reservoir 602 upward through a wick port 606 above the torch 600. The upgrade kit converts the torch 600 for automated refilling from a remote source, such as is illustrated by FIG. 2. A fuel delivery pipe 608 extends from the fuel reservoir 602 downward and out of the base of the torch 600 through the port 610 where the gas plumbing pipe would have otherwise entered the torch 600 if the torch 600 had not been converted to burn liquid fuel.

In the embodiment of FIG. 6, the plug 300 adds additional features to the torch 600 that include a wick igniting mechanism 320 and a wick seal 322 similar to FIG. 3B. In addition, the plug implements a pressure sensor 612 that rests against the inflatable fuel reservoir 602, and senses the expansion and contraction of the fuel reservoir 602 as it is refilled, and as fuel in consumed between refilling, thereby providing an indication of the amount of fuel that is contained within the fuel reservoir 602 at any given time.

Figure 7:
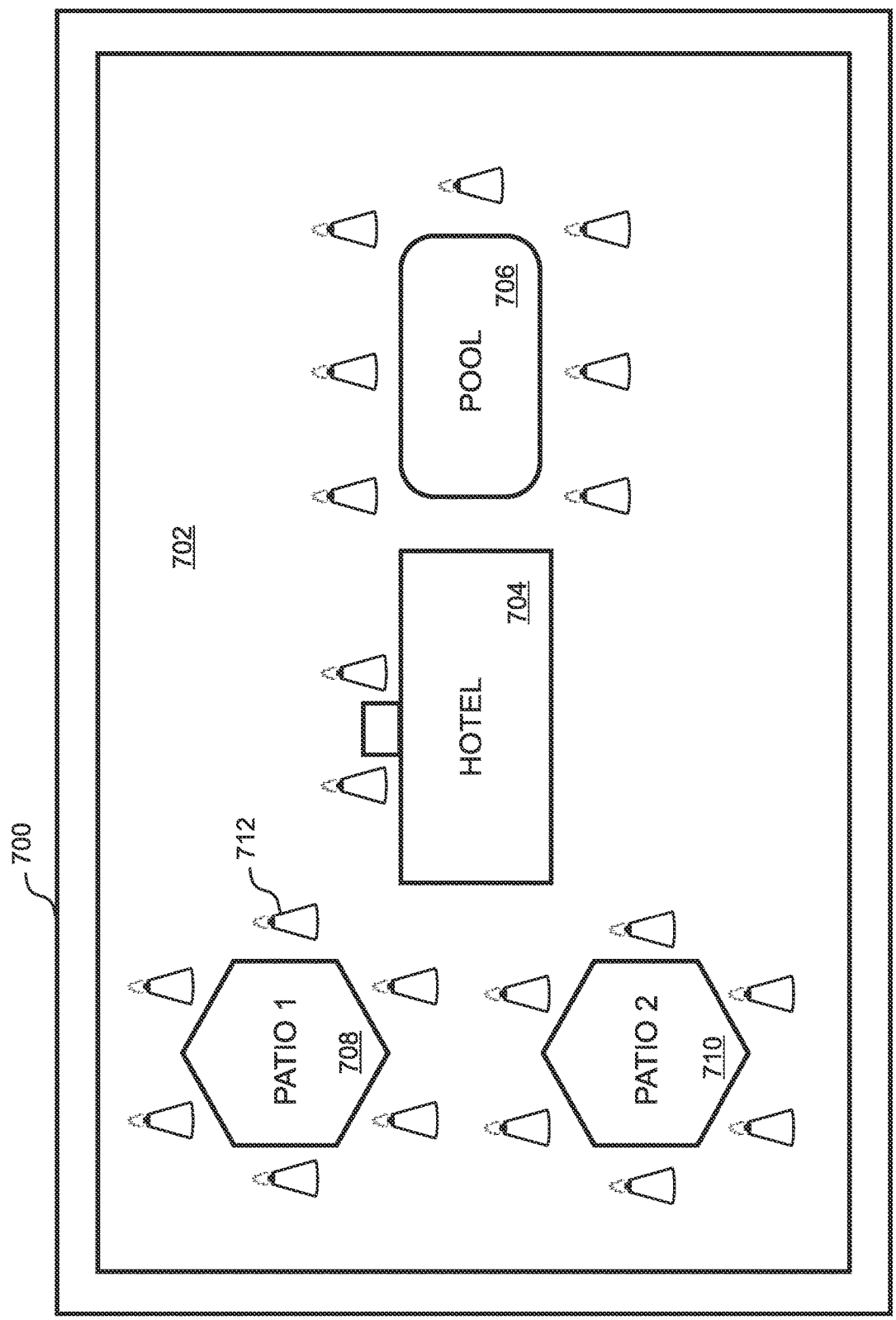
FIG. 7 illustrates presentation to a user of a map showing a distribution pattern of torches having plugs according to the present invention.

As mentioned above, embodiments of the present invention further include a global positioning system (GPS), and are able to transmit location information to a user. FIG. 7 illustrates a digital display screen 700 upon which is displayed a simplified map 702 that indicates the location of a hotel 704 and three surrounding outdoor recreation areas, which are a pool 706 and two multipurpose patios 708, 710. The entrance to the hotel 704 and the outdoor recreation areas 706, 708, 710 are all surrounded by torches 712 that are equipped with GPS capability, for example by installation of plug according to the present invention onto the torches. Based on information received from the GPS systems, the locations of the torches 712 can be automatically indicated on the displayed map 702. This capability could be useful, for example to the management of a hotel chain wishing to verify how and where each of the hotels 704 has deployed its torches 712. In embodiments, additional information received from the torches, for example temperature measurements, is used to indicate which of the displayed torches 712 are burning fuel at any given time.

Figure 8:
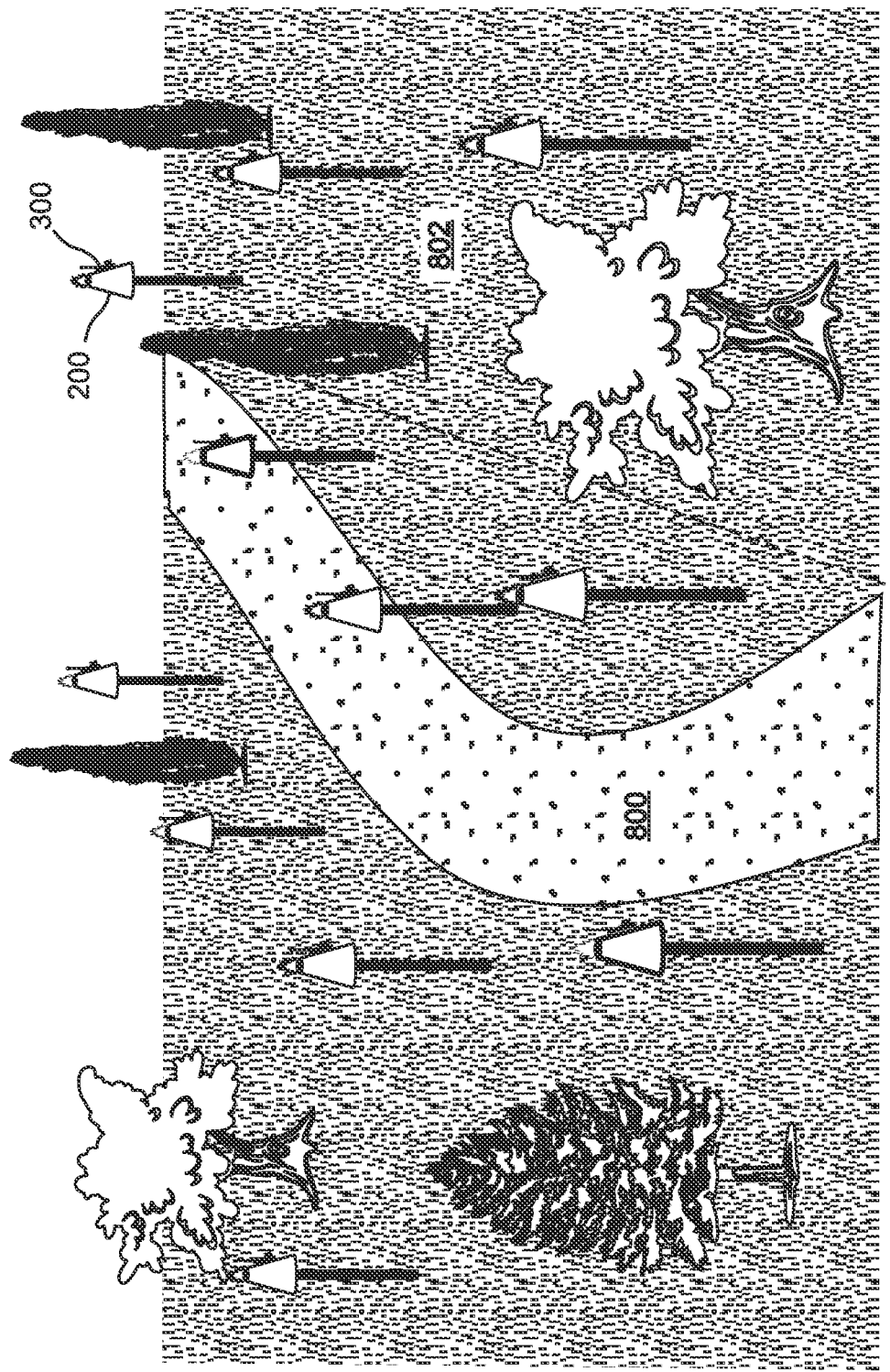
FIG. 8 is a perspective view of an open terrain that includes a plurality of torches in an embodiment of the present invention.

FIG. 8 illustrates an embodiment in which torches 200 into which plugs 300 of the present invention have been incorporated are distributed along a path 800 and in adjacent open terrain 802. The torches 200 are interconnected by underground pipes and/or hoses (not shown) to a central fuel source and pump (also not shown), thereby enabling the torches to be operated without local refueling. The plugs 300 in the illustrated embodiment enable the torches 200 to be ignited, monitored, and extinguished by a remote user who is in wireless communication with the torches.

Figure 9:
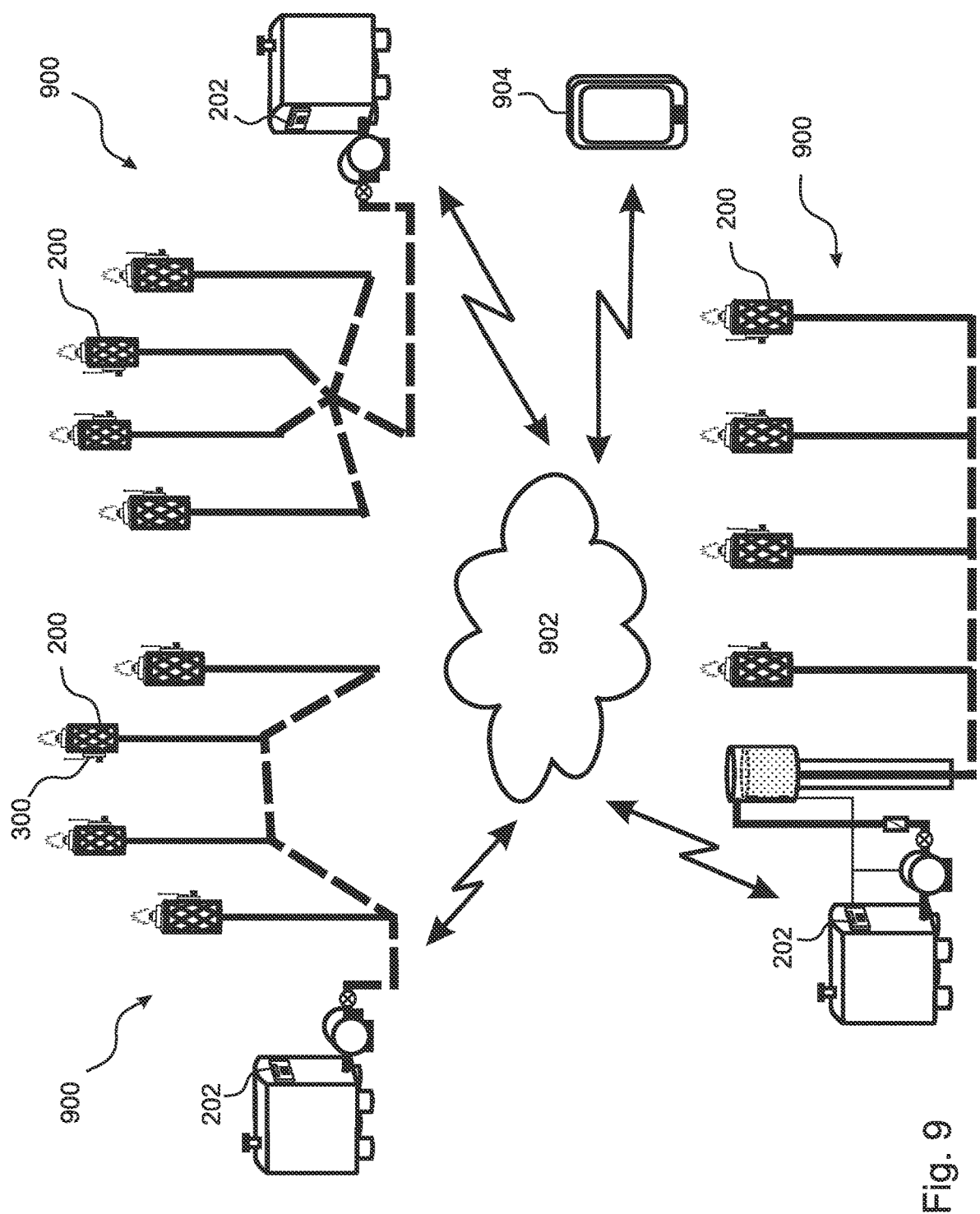
FIG. 9 illustrates a plurality of systems of the present invention that are controlled by a single application or family of applications running in the "cloud."

With reference to FIG. 9, in embodiments a plurality of torches 200, which can be configured in groups 900 of torches 200 as shown in FIG. 2, are configured for control by a single, combined control system, such as a single software application or family of applications running in the "cloud" 902 whereby a computing device 904, such as a laptop computer or hand-held mobile device, can provide remote wireless access to the plugs 300 that are installed on the torches 200, thereby monitoring and/or controlling some or all of the functions of the torches 200 that are implemented by the plug 300.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. A system that is able to automatically refuel a torch, the system comprising:
   a central fuel reservoir configured to contain a combustible liquid fuel;
   a plurality of torches, each of the torches comprising a local fuel tank within an outer wall thereof;
   a fuel plumbing system comprising hoses that are configured to convey said fuel to the local fuel tanks of the torches; and
   a refueling apparatus comprising a pump, the fuel apparatus being configured to cause the fuel to flow from the central reservoir through the fuel plumbing system to the local fuel tanks of the torches, the local fuel tanks being automatically refilled thereby;
   wherein the torches, while interconnected with the central reservoir by the fuel plumbing system, are otherwise structurally independent and separate from each other and from the central reservoir; and
   wherein at least one of the torches further comprises:
      a plug assembly comprising:
      a plug body attached to the outer wall of the torch, said plug body penetrating through the outer wall of the torch so that a first portion of the plug body extends outside of the outer wall of the torch while a second portion of the plug body extends inside of the outer wall of the torch;
      an electronic controller;

a communication apparatus cooperative with the electronic controller; and a temperature sensor in electrical communication with the electronic controller, wherein said electronic controller is able to monitor sensed information provided by the temperature sensor, said electronic controller being controlled remotely by wired or wireless communication of a remote computing device with the communication apparatus and the electronic controller.

2. The system of claim 1, wherein the plug body is configured for attachment to the outer wall of the torch by at least one of magnetic attachment, welding, and gluing.

3. The system of claim 1, wherein the plug body is configured for attachment to the outer wall of the torch by at least one of:
threaded engagement of male threads included on the insertable portion with female threads provided in a rim of the hole provided in the outer wall of the torch;
attachment by friction between the insertable portion and the rim of the hole provided in the outer wall of the torch; and
clamping of the plug to the outer wall of the torch by insertion of the insertable portion through the hole provided in the outer wall of the torch and engagement of male threads included on the insertable portion with a nut applied to the insertable portion from within the torch.

4. The system of claim 1, wherein the plug body is configured to form a liquid-tight seal with the outer wall of the torch.

5. The system of claim 1, wherein the torch includes a fuel level sensor.

6. The system of claim 1, wherein the torch includes a pressure sensor.

7. The system of claim 1, wherein the torch includes a tilt sensor.

8. The system of claim 1, wherein the torch includes a torch igniting mechanism.

9. The system of claim 1, wherein the torch includes a global positioning system receiver.

10. The system of claim 1, wherein the electronic controller is configured to establish a unique electronic torch id, whereby the temperature sensor can be monitored by the remote computing device even if the remote computing device is in wireless communication with a plurality of plugs according to claim 1 that are attached to a corresponding plurality of torches.

11. The system of claim 1, wherein the liquid fuel contains an insect repellant substance.

12. A method of adding at least one sensor and/or torch aspect controller to a fuel-burning torch, the method comprising:
providing:
a central fuel reservoir configured to contain a combustible liquid fuel;
a plurality of torches, each of the torches comprising a local fuel tank within an outer wall thereof;
a fuel plumbing system comprising hoses that are configured to convey said fuel to the local fuel tanks of the torches; and
a refueling apparatus comprising a pump, the fuel apparatus being configured to cause the fuel to flow from the central reservoir through the fuel plumbing system to the local fuel tanks of the torches, the local fuel tanks being automatically refilled thereby;
wherein the torches, while interconnected with the central reservoir by the fuel plumbing system, are otherwise structurally independent and separate from each other and from the central reservoir;
providing a plug assembly comprising:
a plug body attached to the outer wall of the torch, said plug body penetrating through the outer wall of the torch so that a first portion of the plug body extends outside of the outer wall of the torch while a second portion of the plug body extends inside of the outer wall of the torch;
an electronic controller;
a communication apparatus cooperative with the electronic controller; and
a temperature sensor in electrical communication with the electronic controller, wherein said electronic controller is able to monitor sensed information provided by the temperature sensor, said electronic controller being controlled remotely by wired or wireless communication of a remote computing device with the communication apparatus and the electronic controller; and
attaching the plug to an outer wall of one of the fuel-burning torches, such that the plug body penetrates through the outer wall of the torch, causing a first portion of the plug body to extend outside of the outer wall of the torch while a second portion of the plug body extends inside of the outer wall of the torch, the plug body either abutting or entering into a local fuel tank of the torch, said attachment thereby implementing the at least one sensor and/or torch aspect controller that is included with the plug.

13. The method of claim 12, wherein the plug is attached to the outer wall of the fuel-burning torch during manufacturing of the fuel-burning torch.

* * * * *